United States Patent
Lindau

(10) Patent No.: US 9,596,417 B2
(45) Date of Patent: Mar. 14, 2017

(54) EVENT CORRELATION USING DATA HAVING DIFFERENT TIME RESOLUTIONS

(71) Applicant: CORNELL UNIVERSITY, Ithaca, NY (US)

(72) Inventor: Manfred Lindau, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 6 days.

(21) Appl. No.: 14/769,906

(22) PCT Filed: Feb. 26, 2014

(86) PCT No.: PCT/US2014/018686
§ 371 (c)(1),
(2) Date: Aug. 24, 2015

(87) PCT Pub. No.: WO2014/134172
PCT Pub. Date: Sep. 4, 2014

(65) Prior Publication Data
US 2016/0006918 A1    Jan. 7, 2016

Related U.S. Application Data

(60) Provisional application No. 61/769,590, filed on Feb. 26, 2013.

(51) Int. Cl.
| | |
|---|---|
| *H04N 5/228* | (2006.01) |
| *H04N 5/235* | (2006.01) |
| *H04N 5/372* | (2011.01) |
| *G06T 7/00* | (2006.01) |
| *H04N 5/232* | (2006.01) |
| *H04N 5/341* | (2011.01) |

(52) U.S. Cl.
CPC ......... *H04N 5/2355* (2013.01); *G06T 7/0026* (2013.01); *G06T 7/0038* (2013.01); *H04N 5/23232* (2013.01); *H04N 5/372* (2013.01); *H04N 5/341* (2013.01)

(58) Field of Classification Search
CPC .. H04N 5/372; H04N 5/2355; H04N 5/23232; H04N 5/341; G06T 7/0038; G06T 7/0026
USPC .......................................... 348/222.1, 231.5
See application file for complete search history.

(56) References Cited

U.S. PATENT DOCUMENTS

| | | | |
|---|---|---|---|
| 4,764,674 A | 8/1988 | Kinoshita | |
| 8,009,211 B2 | 8/2011 | Hashimoto | |
| 8,279,316 B2 | 10/2012 | Border et al. | |
| 8,508,608 B2 | 8/2013 | Bub | |
| 2004/0100566 A1* | 5/2004 | Valleriano | G07C 1/22 348/231.99 |

(Continued)

OTHER PUBLICATIONS

Axelrod, D., "Total Internal Reflection Fluorescence Microscopy in Cell Biology", Traffic 2:764-774 (2001).

(Continued)

*Primary Examiner* — Antoinette Spinks
(74) *Attorney, Agent, or Firm* — Scully, Scott, Murphy & Presser, P.C.

(57) ABSTRACT

Methods, Systems, Devices and Programs are provided for obtaining high time resolution data from low time resolution data and subsequently comparing the timings of two events which have been simultaneously recorded by devices with two different time resolutions.

25 Claims, 18 Drawing Sheets

(56) References Cited

U.S. PATENT DOCUMENTS

| | | | | |
|---|---|---|---|---|
| 2005/0052541 A1* | 3/2005 | Kondo | ................ | H04N 9/045 348/222.1 |
| 2011/0221929 A1 | 9/2011 | Miyahara et al. | | |
| 2015/0312497 A1* | 10/2015 | Aldridge | ............ | H04N 5/23232 348/157 |
| 2015/0312504 A1* | 10/2015 | Aldridge | ............. | H04N 5/3743 348/157 |

OTHER PUBLICATIONS

Fellers, T.J. et al., "Concepts in Digital Imaging Technology", Digital Camera Readout and Frame Rates [online] (May 15, 2007) [retrieved on Jun. 3, 2014], 6 pages, Retrieved from the Internet: <URL:http://micro.magnet.fsu.edu/primer/digitalimaging/concepts/concepts.html>.

Fordham, J.L.A. et al., "High Time-Resolution Spectroscopic Imaging Using Intensified CCD Detectors", Mon. Not. R. Astron. Soc. 319:414-418 (2000).

Parsons, T.D. et al., "Docked Granules, the Exocytic Burst, and the Need for ATP Hydrolysis in Endocrine Cells", Neuron 15:1085-1096 (Nov. 1995).

International Search Report dated Jun. 19, 2014 received from Application No. PCT/US2014/018686.

Jahn, R. et al., "Membrane Fusion and Exocytosis", Annual Review of Biochemistry 68, pp. 863-911 (1999).

Sutton, R. B. et al., "Crystal structure of a SNARE complex involved in synaptic exocytosis at 2.4A° resolution", Nature 395, pp. 347-353 (1998).

Weber, T. et al, "SNAREpins: Minimal Machinery for Membrane Fusion", Cell, vol. 92, 759-772 ( Mar. 1998).

Hafez, I., et al., "Electrochemical imaging of fusion pore opening by electrochemical detector arrays", Proceedings of the National Academy of Sciences, USA, vol. 102, No. 39, pp. 13879-13884 (Sep. 27, 2005).

An, S. J. et al., "Tracking SNARE Complex Formation in Live Endocrine Cells", Science, vol. 306, pp. 1042-1046, (Nov. 5, 2004).

Wang, L. et al., "The Structural and Functional Implications of Linked SNARE Motifs in SNAP25", Mol Biol Cell vol. 19, pp. 3944-3955 (Sep. 2008).

Takahashi, N. et al., "SNARE Conformational Changes that Prepare Vescisles for Exocytosis", Cell Metab. vol. 12, pp. 19-29 (Jul. 4, 2010).

Sakon, J.J.,et al, "Detecting the conformation of individual proteins in live cells", Nature Methods 7, No. 3, pp. 203-208 (Mar. 2010).

Chow, R. H. et al., "Delay in vesicle fusion revealed by electrochemical monitoring of single secretory events in adrenal chromaffin cells", Nature, vol. 356, pp. 60-63 (Mar. 5, 1992).

Albillos, A. et al., "The exocytotic event in chromaffin cells revealed by patch amperometry", Nature 389, pp. 509-512 (Oct. 2, 1997).

Sorensen, J. B. et al., "Examining Synaptotagmin 1 Function in Dense Core Vesicle Exocytosis under Direct Control of Ca2+", J. Gen. Physiol. 122, pp. 265-276 (Sep. 2003).

Fang, Q., et al., "The role of the C terminus of the SNARE protein SNAP-25 in fusion pore opening and a model for fusion pore mechanics", Proceedings of the National Academy of Sciences, USA, vol. 105, No. 40, pp. 15388-15392, (Oct. 7, 2008).

Knowles, M. K., et al., "Single secretory granules of live cells recruit syntaxin-1 and synaptosomal associated protein 25 (SNAP-25) in large copy numbers", Proc. Natl. Acad. Sci.USA, vol. 107, pp. 20810-20815 (Nov. 30, 2010).

Van Den Bogaart, G. et al., "One SNARE complex is sufficient for membrane fusion", Nat Struct Mol Biol vol. 17, No. 3, pp. 358-365 (Mar. 2010).

Shi, L., et al., "SNARE Proteins: One to Fuse and Three to Keep the Nascent Fusion Pore Open", Science, vol. 335, pp. 1355-1359 (Mar. 16, 2012).

Mohrmann R., et al., "Fast Vesicle Fusion in Living Cells Requires at Least Three SNARE Complexes", Science, vol. 330, pp. 502-505 (Oct. 22, 2010).

Mohrmann R., et al., "SNARE Requirements En Route to Exocytosis: from Many to Few", J Mol Neurosci, vol. 48, pp. 387-394 (Mar. 17, 2012).

Domanska, M. K. et al., "Docking and Fast Fusion of Synaptobrevin Vesicles Depends on the Lipid Compositions of the Vesicle and the Acceptor SNARE Complex-Containing Target Membrane", Biophysical Journal, vol. 99, pp. 2936-2946 (Nov. 3, 2010).

Steyer, J. A. et al., "Transport, docking and exocytosis of single secretory granules in live chromaffin cells", Nature vol. 388, pp. 474-478 (Jul. 31, 1997).

Bub, G. et al: "Pixel multiplexing for high-speed multi-resolution fluorescence imaging", , Oct. 5, 2009 (Oct. 5, 2009), pp. 1-3, XP055147152, Retrieved from the Internet: URL:http://arxiv.org/abs/0910.0789 [retrieved on Oct. 16, 2014].

Berberian, K. et al., "Improved Surface Patterned Platinum Microelectrodes for the Study of Exocytotic Events", Anal. Chem. 81(21):8734-8740, (Nov. 1, 2009).

Mosharov, E. et al., "Analysis of exocytotic events recorded by amperometry", Nature Methods, vol. 2, No. 9, pp. 651-658 (Sep. 2005).

Dias, A.F. et al., "An electrochemical detector array to study biology on the nanoscale", Nanotechnology, vol. 13, pp. 285-289 (2002).

* cited by examiner

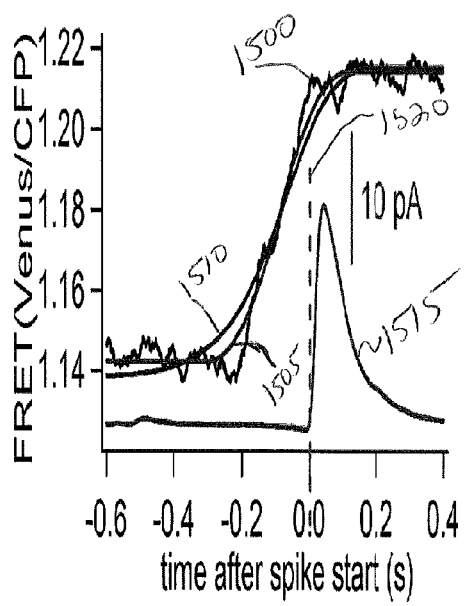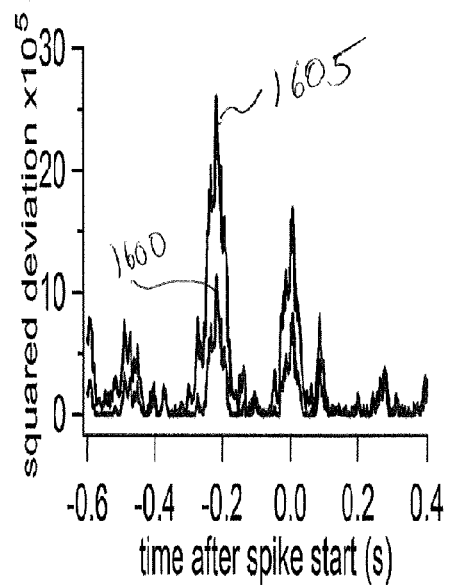
Fig. 15
Fig. 16

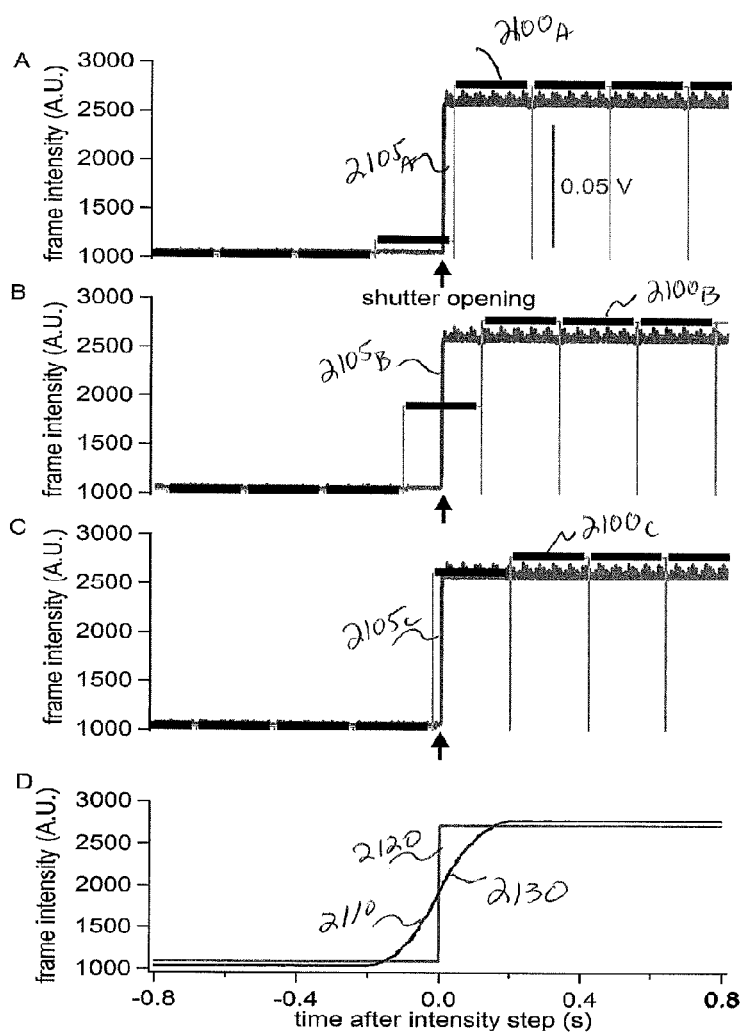

EVENT CORRELATION USING DATA HAVING DIFFERENT TIME RESOLUTIONS

CROSS REFERENCE TO RELATED APPLICATION

This application claims priority to U.S. Provisional Application Ser. No. 61/769,590, filed Feb. 26, 2013, the entirety of which is incorporated by reference.

STATEMENT REGARDING FEDERALLY SPONSORED RESEARCH

This disclosure was made with government support under NIH grant R01 GM085808 awarded by the National Institutes of Health. Microfabrications were performed at the Cornell NanoScale Facility supported by NSF Grant ECS-0335765 awarded by the National Science Foundation. The government has certain rights in this disclosure.

FIELD OF THE DISCLOSURE

This disclosure relates to a system, a device, a method and a program for obtaining high time resolution data from low time resolution data. This disclosure also relates to a system, a device, a method and a program for correlating, in time, events recorded with data having a different time resolution.

BACKGROUND

Different events can be detected using devices having a different time resolution. For example, events can be detected using an imaging device. However, imaging devices typically have low time resolution frame rates when compared with events detected with high time resolution. A frame rate is limited by an exposure time and a readout time.

Other detection devices may not have these limitations. For example, changes in electric potential or other electrochemical events can be detected by devices with high time resolution. When the timing of the detected events is compared, the precision is low.

SUMMARY

A method comprises storing a timing of a reference event. The reference event occurs during a frame time of an image frame from a plurality of imaging events. The frame time is an exposure time and a readout time for an imaging source. Each imaging event has at least one set of image frames. Each set of image frames is recorded simultaneously with the timing of the reference event and each set of image frames has a plurality of image frames. The method further comprises receiving at least one channel of image data for each imaging event from the imaging source. One channel of image data corresponds to one set of image frames, respectively. The method further comprises calculating, for each imaging event, image values for a representative frame set. The representative frame set is determined based on the at least one set of image frames. One image value is calculated for each image frame of the representative frame set. Each image value is based on a characteristic of a plurality of pixels within a respective image frame of the representative frame set. The representative frame set has the same number of image frames as the at least one set of image frames. The characteristic is determined from the at least one channel of image data. The method further comprises assigning, for each imaging event, the calculated image value of a respective image frame as a trace value for each trace point during the exposure time of the respective image frame and a portion of the readout time before the exposure time of the respective image frame and a portion of the readout time following the exposure time of the respective image frame to generate an intensity trace for a respective imaging event. The assigning is performed for each image frame in the representative frame set for the respective imaging event. The method further comprises shifting in time, the intensity trace for each respective imaging event to align the timing of the reference event for each imaging event of the plurality of imaging events. The method further comprises averaging, trace values of trace points aligned in time from each shifted intensity trace to generate an average continuous intensity trace over time. The method further comprises determining, a timing of an event based on the average continuous intensity trace.

Also disclosed is a device comprising a storage device configured to store at least one channel of image data for a plurality of imaging events received from an imaging source and a timing of a reference event. Each imaging event has at least one set of image frames. Each set of image frames is recorded simultaneously with the timing of the reference event. Each set of image frames has plurality of image frames. The reference event occurs during a frame time of an image frame from the plurality of imaging events. The frame time is an exposure time and a readout time for the imaging source. The device further comprises a processor comprising hardware configured to: calculate, for each imaging event, image values for a representative frame set. The representative frame set is determined based on the at least one set of image frames. One image value is calculated for each image frame of the representative frame set. Each image value is based on a characteristic of a plurality of pixels within a respective image frame of the representative frame set. The representative frame set has the same number of image frames as the at least one set of image frames. The characteristic is determined from the at least one channel of image data. The processor is further configured to assign, for each imaging event, the calculated image value of a respective image frame as a trace value for each trace point during the exposure time of the respective image frame and a portion of the readout time before exposure time of the respective image frame and a portion of the readout time following the exposure time of the respective image frame to generate an intensity trace for a respective imaging event. The assigning is performed for each image frame in the representative frame set for the respective imaging event. The processor is further configured to shift, in time, the intensity trace for each respective imaging event to align the timing of the reference event for each imaging event of the plurality of imaging events. The processor is further configured to average, trace values of trace points aligned in time from each shifted intensity trace to generate an average continuous intensity trace over time. The processor is further configured to determine, a timing of an event based on the average continuous intensity trace. The device further comprises a display configured to display the average continuous intensity trace.

Also disclosed is a computer readable storage device having a program, which when executed by a computer, causes the computer to execute a method of: calculating, for each imaging event of a plurality of imaging events, where each imaging event has at least one set of image frames, each set of image frames being recorded simultaneously with the timing of the reference event and each set of image frames having plurality of image frames, image values for a representative frame set. The representative frame set is determined based on the at least one set of image frames. One image value is calculated for each image frame of the representative frame set. Each image value being based on a characteristic of a plurality of pixels within a respective image frame of the representative frame set. The representative frame set has the same number of frames as the at least one set of image frames. The characteristic is determined from the at least one channel of image data. The computer readable storage device having a program, which when executed by a computer, causes the computer to execute a method further comprising assigning, for each imaging event of the plurality of imaging events, the calculated image value of a respective image frame as a trace value for each trace point during the exposure time of the respective image frame and a portion of the readout time before exposure time of the respective image frame and a portion of the readout time following the exposure time of the respective image frame to generate an intensity trace for a respective imaging event. The assigning being performed for each image frame in the representative frame set for the respective imaging event. The computer readable storage device having a program, which when executed by a computer, causes the computer to execute a method further comprising shifting in time, the intensity trace for each respective imaging event to align the timing of a reference event for each imaging event of the plurality of imaging events. The reference event occurs during a frame time of an image frame in each of the plurality of imaging events. The frame time is an exposure time and a readout time for an imaging source. The computer readable storage device having a program, which when executed by a computer, causes the computer to execute a method further comprising averaging, trace values of trace points aligned in time from each shifted intensity trace to generate an average continuous intensity trace over time. The computer readable storage device having a program, which when executed by a computer, causes the computer to execute a method further comprising determining, a timing of an event based on the average continuous intensity trace.

BRIEF DESCRIPTION OF THE FIGURES

Aspects of the disclosure will now be described by way of non-limiting examples with reference to the following figures:

FIG. 15 depicts average continuous intensity trace for Fluorescence Resonance Energy Transfer fitted with two step functions and average continuous intensity trace for amperometrically detected spikes determined in accordance with aspects of the disclosure;

FIG. 16 depicts squared deviations of the two fitted step response functions depicted in FIG. 15 from the average continuous intensity trace for Fluorescence Resonance Energy Transfer also depicted in FIG. 15;

FIGS. 21A-21D illustrate results of a second shutter opening experiment in accordance with aspects of the disclosure.

DETAILED DESCRIPTION

Figure 1:
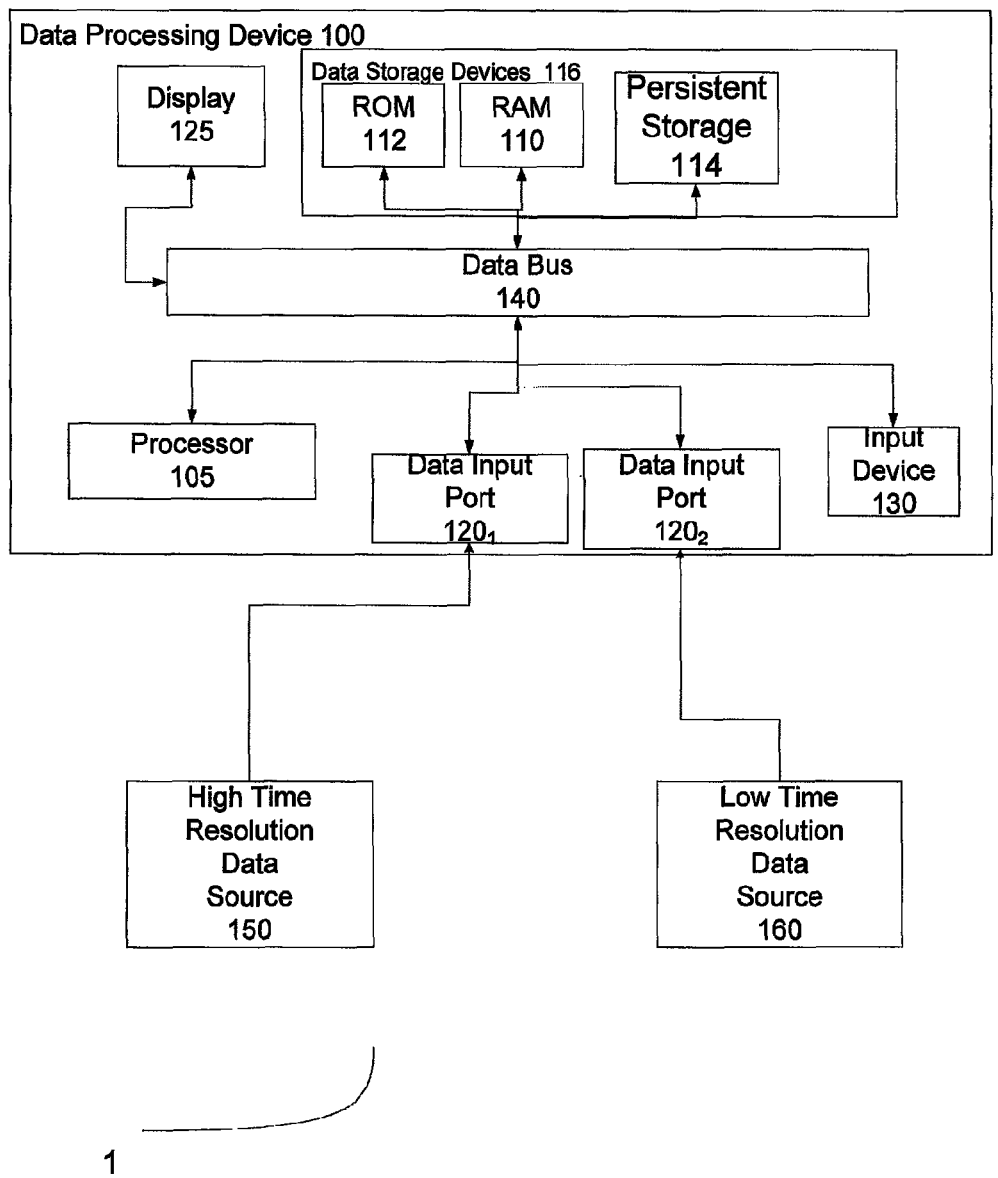
FIG. 1 illustrates an example of a system in accordance with aspects of the disclosure.

FIG. 1 illustrates an example of a system 1 in accordance with aspects of the disclosure. The system 1 includes a Data Processing Device 100, a High Time Resolution Data Source 150 and a Low Time Resolution Data Source 160. The use of the terms "high" and "Low" herein means that one data source has a time resolution higher than the time resolution of the other data source and does not reflect a classification based on a threshold time resolution value.

The Data Processing Device 100 includes a Processor 105, Data Storage Devices 116, such as RAM 110, ROM 112 and Persistent Storage 114, Data Input Ports (collectively 120), a Display 125, and an Input Device 130. The Data Processing Device 100 also includes a bus (Data Bus 140), which provides communication between the Processor 105, Data Storage Device(s) 116 (including RAM 110, ROM 112 and Persistent Storage 114), the Data Input Ports 120, Display 125 and Input Device 130.

Although, not shown, the Data Processing Device 100 can also include a communication unit such as a network interface card.

In an aspect of the disclosure, the Processor 105 is configured to execute one or more programs stored in a computer readable storage device. The computer readable storage device can be RAM 110, persistent storage 114 or removable storage. For example, the Processor 105 can execute instructions in a program that may be loaded into RAM 110.

Computer readable storage device may be in a tangible or hardware form, such as, an optical or magnetic disc that is inserted or placed into a drive or other portion or device for transfer onto an internal storage device, such as a hard drive. Additionally, the computer readable storage device also may take the form of a hard drive, a thumb drive, or a flash memory that is connected to Data Processing Device 100.

The Processor 105 may include one or more processing units.

RAM 110, ROM 112 and Persistent Storage 114 are only examples of Data Storage Devices 116. A storage device is any piece of hardware that is capable of storing information, such as, for example without limitation, data, programs, instructions, program code, and/or other suitable information either on a temporary basis and/or a permanent basis.

FIG. 1 depicts RAM 110, which hereinafter is used interchangeably with "Working Storage Device"; however, any other suitable volatile memory can be used.

Persistent Storage 114 can take various forms. For example, Persistent Storage 114 can contain one or more components or devices. For example, Persistent Storage 114 may be a hard drive (e.g., HDD), a flash memory, a rewritable optical disk, a rewritable magnetic tape, or some combination of the above. The medium or media used by Persistent Storage 114 also may be removable. For example, a removable hard drive may be used.

The Input Device 130 can provide a connection for user input such as, but not limited to, through a keyboard, a mouse, a touch panel, a touch screen or pad, and/or some other suitable input device.

The Display 125 provides a way to display information to a user. The Display 125 can be, but is not limited to, LCD or plasma.

Data received from the High Time Resolution Data Source 150 and the Low Time Resolution Data Source 160 can be initially stored in Persistent Storage 114. The data can be directly received or directly received from the High Time Resolution Data Source 150 and the Low Time Resolution Data Source 160. Although, not shown in FIG. 1, the data can be pre-processed by a signal conditioning system prior to being input into the Data Processing Device 100.

The data can be copied or moved to the Working Data Storage. Additionally, when the Processor 105 processes the data, the processed data can be stored in the Working Data Storage. The processed data can also be copied or moved to Persistent Storage 114.

The data is received from the High and Low Time Resolution Sources (150 and 160) via Data Input Ports $120_1$ and $120_2$, respectively. While FIG. 1 shows two data input ports, any number of data input ports can be included in the Data Processing Device 100 and two are only shown as representative ports.

The Data Input Ports 120 can be any interface between the Data Processing Device 100 and an external device, such as, but not limited to, serial and parallel connections, Digital Video Interface (DVI), High-Definition Multimedia Interface (HDMI), Small Computer System Interface (SCSI), Peripheral Component Interconnect (PCI) or USB.

Additionally, FIG. 1 shows one High Time Resolution Data Source 150 and one Low Time Resolution Data Source, however, any number of High and Low Time Resolution Data Sources can be used. For example, a High Time Resolution Data Source 150 can be correlated with two different events detected by two different Low Time Resolution Data Sources.

A High Time Resolution Data Source 150 can be, but is not limited to, a rapid signal recorded with an array of electrodes, a shutter opening from an illumination source, application of a field stimulation pulse from a current or voltage source, application of a voltage or current stimulus, measurement of a stimulated or spontaneous rapid current or voltage signal such as an action potential with a suitable amplifier, an optical pulse source such as a laser or a flash lamp, a photodiode or photomultiplier signal, or any device or means for generating or probing a rapid perturbation or a device or means that can produce or detect a rapid phenomena.

A High Time Resolution Data Source 150 can be used to detect events such as, but not limited to, single vesicle release events, flash illuminations, calcium influx, electrical stimulation of a cell, and other electrophysiological stimulus, electrophysiologically recorded events, such as action potential, optically produced events, such as, uncaging of an active compound such as calcium, protons, neurotransmitters, optical activation of a genetically encoded light sensitive protein such as channel rhodopsin or light sensitive groups chemically linked to a molecule of interest.

A Low Time Resolution Data Source 160 can be, but is not limited to, an imaging source such as a CCD, an EMCCD, a photomultiplier or photodiode signal, an audio source, a temperature or chemical sensor, or a sensor detecting any physical quantity of interest, and a device having a data or signal integrated over a low time resolution period. Low Time Resolution Data Sources 160 can be used to detect events such as, but is not limited to, Fluorescence changes with of specific proteins such as, GFP, CFP and Venus, and others, Fluorescence Resonance Energy Transfer (FRET), Fluorescence changes or fluorescence ratio changes of probes sensing ion concentration, pH, membrane potentials, or other quantities, any light intensity change including fluorescence and absorption, any other physical quantities acquired by data or signal integration. A gate pulse for the low resolution signal can be used to synchronize the high time resolution data with the low time resolution data. Additionally or alternatively, an integration start pulse or an integration end pulse can be used.

In accordance with aspects of the disclosure, any high time resolution event can be correlated in time with a low time resolution event which is simultaneously recorded. For example, any of the high time resolution events described herein and can be correlated with any low time resolution event described herein, which is simultaneously recorded.

Additionally, the Data Processing Device 100 can include programming environments, tools or packages which can be used to generate graphs, charts, and for data analysis or image processing. For example, an environment, tool or package can be, but is not limited to, Igor Pro (from Wavemetrics), LabVIEW (National Instruments Corporation) or Matlab® (The MathWorks, Inc). These environments, tools and/or packages can be configured or customized by a script or user code, program code and/or user defined modules to execute functionality described herein. The script, user code, program code or user defined modules are examples of the programs, instructions, and/or program code disclosed herein.

These environments, tools or packages such as, LabVIEW, Igor Pro and/or Matlab® are well known in the art and will not be described herein. While certain environments, tools, and packages have been described herein, any environment, tool or package can be used.

Figure 2:
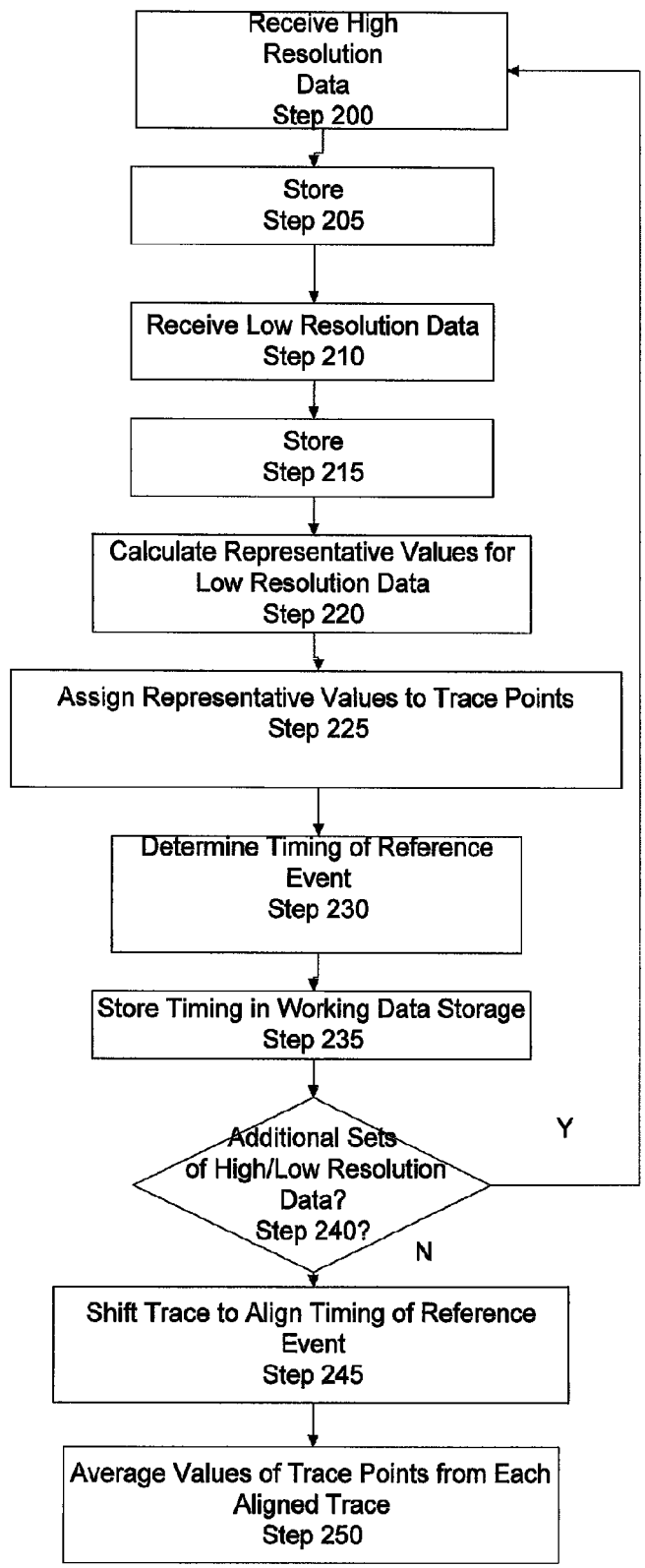
FIG. 2 illustrates a flow chart for a method of obtaining high time resolution data from low time resolution data in accordance with aspects of the disclosure.

FIG. 2 illustrates a flow chart for a method of obtaining high time resolution data from low time resolution data in accordance with aspects of the disclosure.

In an aspect of disclosure, the data from both the Low Time Resolution Data Source 160 and the data from the High time Resolution Data Source 150 is recorded simultaneously. Multiple Sets of Low/High time resolution data are recorded. A Set of Low/High time resolution data refers to one iteration of the data collection. The number of sets can vary and can be application specific.

A synchronization signal ("synch signal") can be used to synchronize start times for Set of Low/High time resolution data. A synch signal can be received from at least one of the High Time Resolution Data Source 150 and the Low Time Resolution Data Source 160 indicating a start of the recording of the data.

At Step 200, the Data Processing Device 100 receives one set of high time resolution data from the High Time Resolution Data Source 150 via one of the Data Input Ports (e.g., $120_1$). The high time resolution data is stored in Persistent Storage 114 at step 205. The high time resolution data will subsequently be copied or moved to Working Data Storage 110 for processing.

At Step 210, the Data Processing Device 100 receives one set of low time resolution data from the Low Time Resolution Data Source 160 via another of the Data Input Ports (e.g., $120_2$). The low time resolution data is stored in Persistent Storage 114, step 215. The low time resolution data will subsequently be copied or moved to Working Data Storage 110 for processing.

FIG. 2 shows steps 200 and 205 before steps 210 and 215; however, this is for descriptive purposes only. The data from the data sources, High Time Resolution Data Source 150 and Low Time Resolution Data Source 160 can be received in any order or concurrently.

A set of low time resolution data is copied or moved to Working Data Storage 110. At Step 220, the Processor 105 calculates a representative value for each data point within the set of low time resolution data. The set of low time resolution data may include one or more data points in a time sequence. The representative value can be based on an intensity of each data point, e.g., magnitude. In an aspect of the disclosure, each data point may include a plurality of values. The representative value can be calculated by a mean of the plurality of values, the highest value of the plurality of values, and the mode of the plurality of values. For example, if the data point is an image frame, the data point includes a plurality of values indicating intensity of pixels within an image frame. In this case, the representative value can be an average intensity of the pixel values from more than one pixel in a region of interest ("ROI").

The Processor 105 stores the representative value for each data point in one set of low time resolution data in Working Data Storage 110.

At Step 225, the Processor 105 creates an intensity trace for one set of the low time resolution data. For each data point, in one set of the low time resolution data, the Processor 105 assigns the representative value as the trace value for a preset time within an intensity trace. The preset time equals a time resolution of the low time resolution data. For example, if each data point is generated every 1 second, the time resolution is 1 second and the representative value is assigned as the trace value for each trace point for 1 second.

For an imaging source, the time resolution includes the exposure time and a readout time. For other sources, the time resolution may also include a gap or dead time. The trace values for the intensity trace for the set of low time resolution data is stored in Working Data Storage 110.

Additionally, the trace values can be stored in Persistent Storage 114.

A set of high time resolution data is copied or moved to Working Data Storage 110. The set of high time resolution data also may have one or more data points in time sequence. At Step 230, the Processor 105 examines the data points to determine a time of the reference event. The time of the reference event may be determined based on a rate of change of the data points in the time sequence. In another aspect of the disclosure, the time of the reference event may be determined based on a magnitude of each data point in the time sequence. In another aspect of the disclosure, the time of the reference event may be determined based on a comparison of the magnitude of each data point in the time sequence with a magnitude threshold. In another aspect of the disclosure, the timing of the reference event may be determining using a linear or nonlinear fit between two or more points with respect to a baseline value.

At Step 235, the Processor 105 stores the determined time of the reference event, e.g., timing, in Working Data Storage 110. Additionally, the timing can be stored in Persistent Storage 114.

Steps 200-235 are repeated for each set of Low/High time resolution data received from the Low Time Resolution Data Source 160 and High Time Resolution Data Source 150.

At step 240, a determination is made if there are additional sets of Low/High time resolution data. If there are additional data sets ("Y" at step 240), steps 200-235 are repeated for the additional data sets. If all of the data sets are processed ("N" at step 240), the process proceeds to step 245.

The Processor 105 retrieves the intensity trace for each set of the low time resolution data and the corresponding reference times from the Working Data Storage 110.

At Step 245, the Processor 105 shifts the intensity trace for each set of the low time resolution data to align the timing of the reference event for each intensity trace. A trace may not need to be shifted if the reference event is already aligned with the reference event in other intensity traces. Each individual intensity trace will be desynchronized with respect to each other, but aligned with respect to the timing of the reference event.

At Step 250, the Processor 105 averages the trace values for the aligned trace points from each of the shifted intensity trace. For example, if there are 100 data sets (100 intensity traces), the processor 105 averages the trace values for the 100 trace points which are aligned in time. The average trace values are used to create an average continuous intensity trace. The average continuous intensity trace has the same resolution as the high time resolution data.

The average continuous intensity trace is stored in the Working Data Storage 110. Additionally, the average continuous intensity trace can be displayed on a Display 125. The average continuous intensity trace can also be stored in the Persistent Storage 114.

Figure 3:
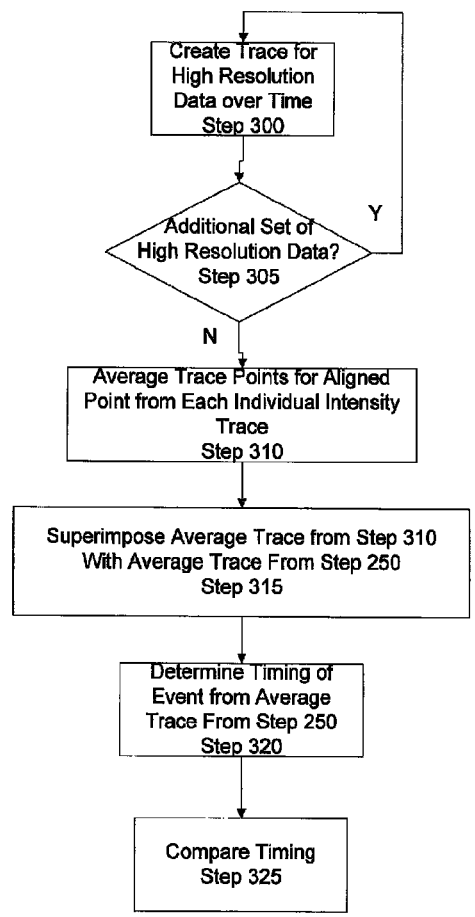
FIG. 3 illustrates a flow chart for a method of comparing the timing of events in accordance with aspects of the disclosure.

FIG. 3 illustrates a flow chart for a method of comparing the timing of events in accordance with aspects of the disclosure.

At Step 300, the Processor 105 creates an intensity trace of one set of high time resolution data. Trace values can be determined based on a magnitude or average of the magnitudes of detected signal(s). For example, the trace values can be the magnitude of detected current or voltage value over a period of interest, e.g., the recording time.

While FIG. 3 describes certain steps separately, the functionality described therein can be performed concurrently with the steps described in FIG. 2. For example, when the Processor 105 determines the timing of the reference event, the Processor 105 can create the intensity trace for the set of high time resolution data. The intensity trace for each set of high time resolution data is also stored in Working Data Storage 110. Additionally, the intensity trace for each set of high time resolution data can be also stored in Persistent Storage 114.

Step 300 is repeated for each set of high time resolution data. At step 305, a determination is made if there are additional sets of high time resolution data. If there are additional sets of high time resolution data ("Y" at step 305), step 300 is repeated for the additional set. If all of the sets of high time resolution data sets are processed, e.g. "N" at step 305), the process proceeds to step 310.

The Processor 105 retrieves each intensity trace from the Working Data Storage 110. At step 310, the Processor 105 generates an average image intensity trace for the high time resolution data. While step 310 is described separately, when the Processor 105 shifts the intensity traces generated from the sets of low time resolution data to align the timing of the reference event (at step 245), the Processor 105 can also generate the average continuous intensity trace for the high time resolution data. The intensity traces for the high time resolution is similarly shifted to align the traces based on the timing of the reference event. In an aspect of the disclosure, the timing of the reference event centered on the average continuous intensity trace (t=0) for the high time resolution data.

The Processor 105 averages the trace values for the aligned trace points from each of the individual intensity traces for the respective sets of high time resolution data. For example, if there are 100 data sets (100 intensity traces), the Processor 105 averages the trace values for the 100 trace points which are aligned in time. The average trace values are used to create the average continuous intensity trace. The average continuous intensity trace is stored in the Working Data Storage 110. Additionally, the average continuous intensity trace can be also stored in Persistent Storage 114.

At Step 315, the Processor 105 superimposes the average continuous intensity trace created from the sets of low time resolution data with the average continuous intensity trace created from the sets of high time resolution data. The superimposed traces can be displayed on the display 125.

At Step 320, the Processor 105 determines a timing of an event that occurred during the recording period using the average continuous intensity trace created from the sets of low time resolution data.

The event may be indicated by a change of intensity of traces values over time, a rate of change of the trace values in the time sequence. In another aspect of the disclosure, the event may be indicated by a magnitude of each trace value in the time sequence. In another aspect of the disclosure, the event may be indicated based on a comparison of the magnitude of each data point in the time sequence with a magnitude threshold.

For example, in an aspect of the disclosure, the timing of the event is a time when a trace value has a value 50% of the maximum intensity for the average continuous intensity trace.

Further, the average continuous intensity trace generated from the sets of low time resolution data can be compared and fit to a theoretical continuous intensity trace, e.g., a step response function. In another aspect of the disclosure, the timing can be the time were a trace value has a value 50% of the maximum intensity for the step function fit to the average continuous intensity trace.

At Step 325, the Processor 105 compares the timing of the event and the timing of the reference event.

In another aspect of the disclosure, the timing of the reference event, the timing of event and other data can be also stored in the Persistent Storage 114 or other storage device for long term storage.

The above described method, system, device and program for obtaining high time resolution data from low time resolution data can be applied to any high time resolution data source and any low time resolution data source where the data is simultaneously recorded with multiple iterative recordings.

For example, the method, system, device and program can be applied to imaging sequences from an imaging source used to detect a fluorescence resonance energy transfer simultaneously recorded with a high time resolution data. The high time resolution data can be obtained, for example, using an electrode array. Other high time resolution sources can be a photodetector.

Additionally, the above-described method of comparing data from two data sources can be applied to determining a relative timing difference between the FRET event and a single vesicle release event.

Figure 4:
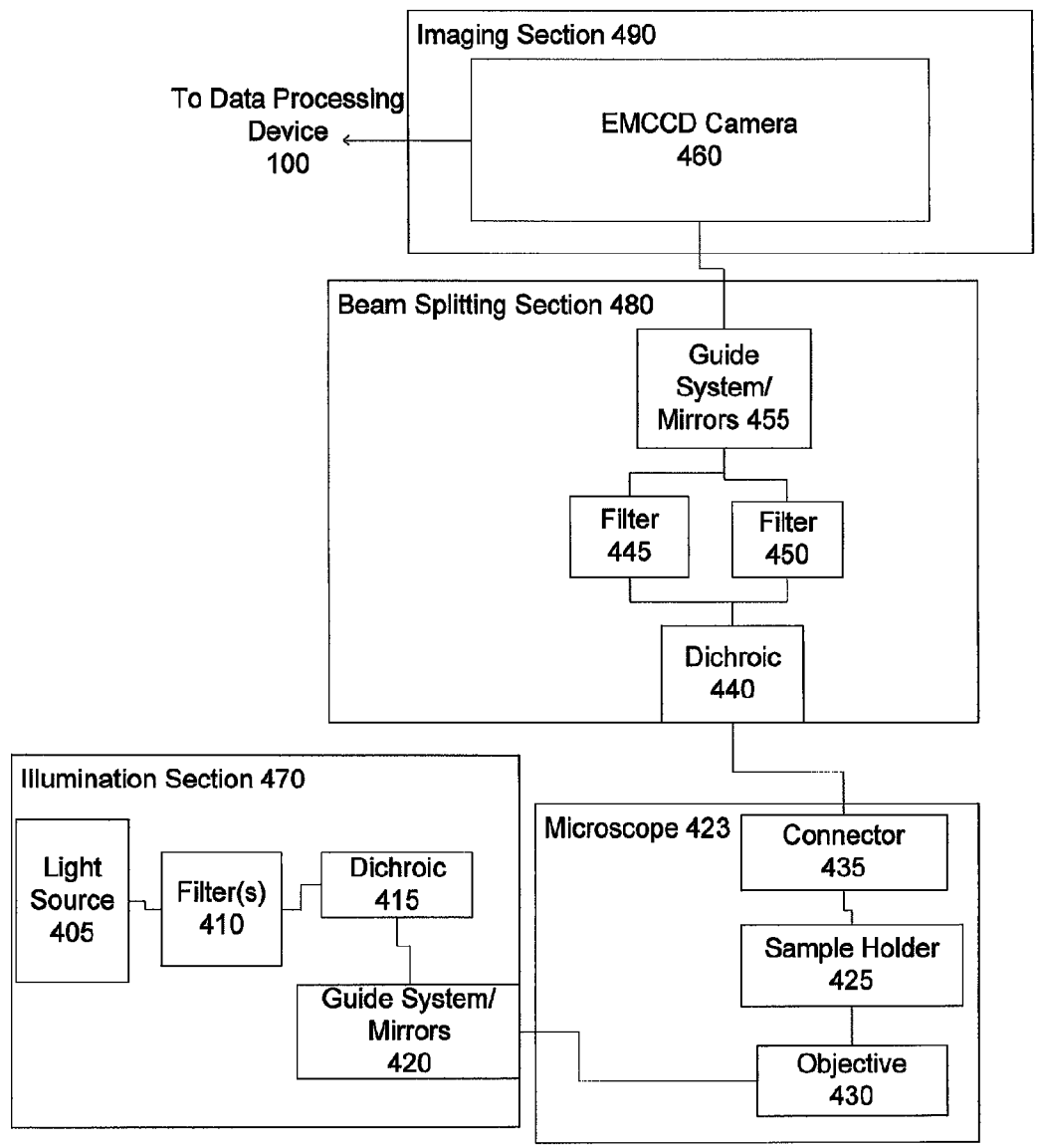
FIG. 4 illustrates a block diagram of an example of a total internal reflection (TIR) fluorescence system.

FIG. 4 illustrates a block diagram of an example of a total internal reflection (TIR) fluorescence system for detecting an FRET. The TIR fluorescence system includes an Illumination Section 470, a Microscope 423, a Beam Splitting Section 480 and an Imaging Section 490.

The Illumination Section 470 includes a Light Source 405, a Filter(s) 410, and a Dichroic 415. The Illumination Section 470 can also include light Guide System/Mirrors 420. The Light Source 405 can be a lamp. For example, a mercury arc lamp (made by X-Cite®, 120PC) can be used as the Light Source. The light is channeled through an Excitation Filter 410. The Excitation Filter 410 can be configured to let a certain wavelength band through. For example, a 436/10 nm excitation filter can be used. The filtered light travels through a dichroic 415, such as a 455 dichroic. The Illumination Section 470 can include one or more light guides or mirrors 420 to channel or focus the light path, as needed.

FIG. 4 illustrates the Illumination Section 470 separate from the Microscope 423, however, portions of the Illumination Section 470 can be included within a housing of the Microscope 423.

FIG. 4 depicts one example of an Illumination Section 470, however, other illumination sections including ones that have different light source(s) can be used such as the illumination sections and light sources described in Total Internal Reflection Fluorescence Microscopy in Cell Biology, D. Axelrod, Traffic 2001; 2: 764-774, the entirety of which is incorporated by reference.

The light generated by the Illumination Section 470 is channeled to a Microscope 423. For example, the Microscope 423 can be a Zeiss Axiovert 135 TV microscope. Other microscopes can be used as well such as the microscopes described in Total Internal Reflection Fluorescence Microscopy in Cell Biology, D. Axelrod, Traffic 2001; 2: 764-774, the entirety of which is incorporated by reference.

The internal structure of a Microscope 423 such as the Zeiss Axiovert 135 TV microscope is well known in the art and therefore will not be described in detail herein. FIG. 4 illustrates certain components of the Microscope 423 for illustrates purposes only.

The Microscope 423 can be fitted with an opaque disk positioned at an equivalent upbeam of the back focal plane of the Objective 430 (aperture plane), to produce a sharp-edge shadow image such that only supercritical light passes through the objective 430. Certain microscopes mark the aperture plane. If not marked, the aperture plane can be created using two lenses.

Other configuration can be used such as described in Total Internal Reflection Fluorescence Microscopy in Cell Biology, D. Axelrod, Traffic 2001; 2: 764-774, the entirety of which is incorporated by reference.

The Microscope 423 also includes an Objective 430 and a Connector 435. The Objective 430 can be, but is not limited to, a Zeiss Plan-Fluar 1.45 NA 100X oil objective. The objective 430 can be below the Sample Holder 425 (inverted) or above the Sample Holder 425 (upright).

The Connector 435 is configured to be coupled to a Beam Splitting Section 480. For example, a DC2™ by Photometrics® can be used as a Beam Splitting Section 480, e.g., beam splitter. Other optical beam splitters can be used, such as one of the OptoSplit devices by Cairn Research, Ltd. or Dual View™, by Optical Insights, LLC. Elements 440-450 would be included in the beam splitter. The Connector 435 would typically be located at the top of the housing of the Microscope 423.

A dichroic 440 can be used to divide the received light into two channels. For example, a 505 nm dichroic can be used. Two filters (445 and 450), e.g., emission filters, can be configured to allow wavelengths in a predefined band. One filter can be configured to allow, e.g., 465-495 nm band, for a CFP channel. Another filter can be configured to allow, e.g., 520-550 nm, for a Venus channel. The Beam Splitting Section 480 can also include one or more Guide System/Mirrors 455 to channel light to an Imaging Source. An Imaging Source be can an EMCCD camera 460, such as (iXon series by Andor Technology plc.), with the associated imaging program. The EMCCD 460 outputs the image data to the Data Processing Device 100. The image data includes two simultaneously recorded channels of data, e.g., 465-495 nm and 520-550 nm.

The associated imaging program is stored in the Persistent Storage 114 and can be copied or moved to Working Data Storage 110 during data processing.

The EMCCD camera 460 has a frame rate equal to the sum of the exposure time and readout time. For example, the exposure time can be approximately 200 ms and the readout time, e.g., readout interval, can be approximately 19 ms, where a frame can be generated every 219 ms. The EMCCD camera 460 has a pixel resolution of M by N pixels per frame. M and N are integers and can be equal.

The EMCCD camera 460 also transmits a TTL signal to the Data Processing Device 100. The TTL signal indicates exposure times for the frames in order to synchronize a timing of the image frames and the data from the high time resolution source.

Cell sample(s), under testing can be prepared in accordance with the method described in T. D. Parsons et al., Docked Granules, the Exocytic Burst, and the Need for ATP Hydrolysis in Endocrine Cells, Neuron 15, 1085-1096, November 1995, the entirety of the description of which is incorporated herein by reference.

A single vesicle release event ("release event") can be amperometrically detected by an electrode array 500. The release event described herein includes, but is not limited to, exocytotic catecholamine release.

Figure 5:
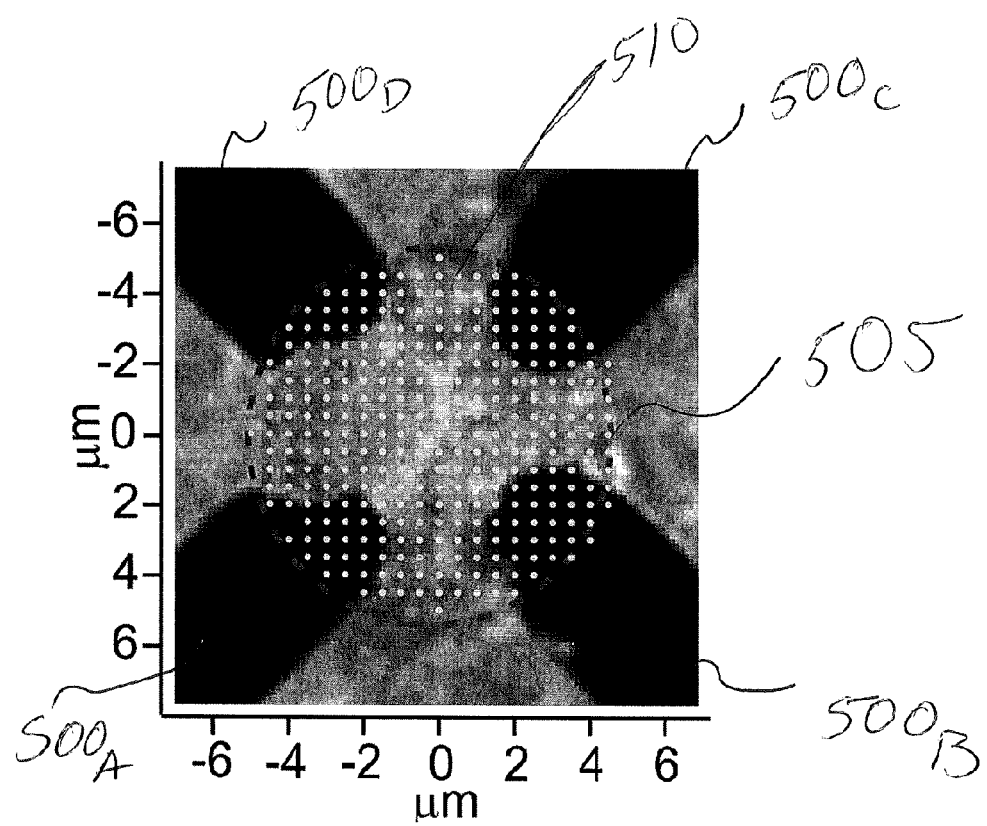
FIG. 5 illustrates a Brightfield image showing an electrode array.

FIG. 5 illustrates an electrode array (collectively 500) which includes four electrodes $500_{A-D}$ as seen from an example of a Brightfield image. A Brightfield image is an image generated using white light. The Brightfield image can be generated prior to total internal reflection (TIR) fluorescence imaging to determine a location of the electrode array. Alternatively, the Brightfield image can be generated afterward.

Generating a Brightfield image is well known and will not be described herein in detail. In an aspect of this disclosure, the same microscope used in the total internal reflection (TIR) fluorescence system can be used for the Brightfield imaging. The light source is a white light source. The Illumination Section 470 (external) and the Beam Splitting Section 480 is not used. The same image detector, e.g., EMCCD camera can also be used.

The electrode array 500 is depicted as black images within the 12 μm v. 12 μm image (−6 μm to 6 μm) in both the vertical and horizontal direction. The 4 Pt conductors, e.g., electrodes $500_{A-D}$, which are depicted in black, are covered by a translucent (and invisible) insulating layer that was removed in the region outlined by the dashed circle 505. Within the dashed circle 505, the tips of 4 electrodes are exposed for the detection of single vesicle release events, e.g., fusion events. FIG. 5 also depicts a grid 510 within the dashed circle 505, e.g., 500 nm grid, as illustrated by the dots. The grid 510 is used as potential release locations for release simulation, which will be described later, for providing expected fractions of molecules detected by the 4 individual electrodes for these locations.

Figures 6, 7:
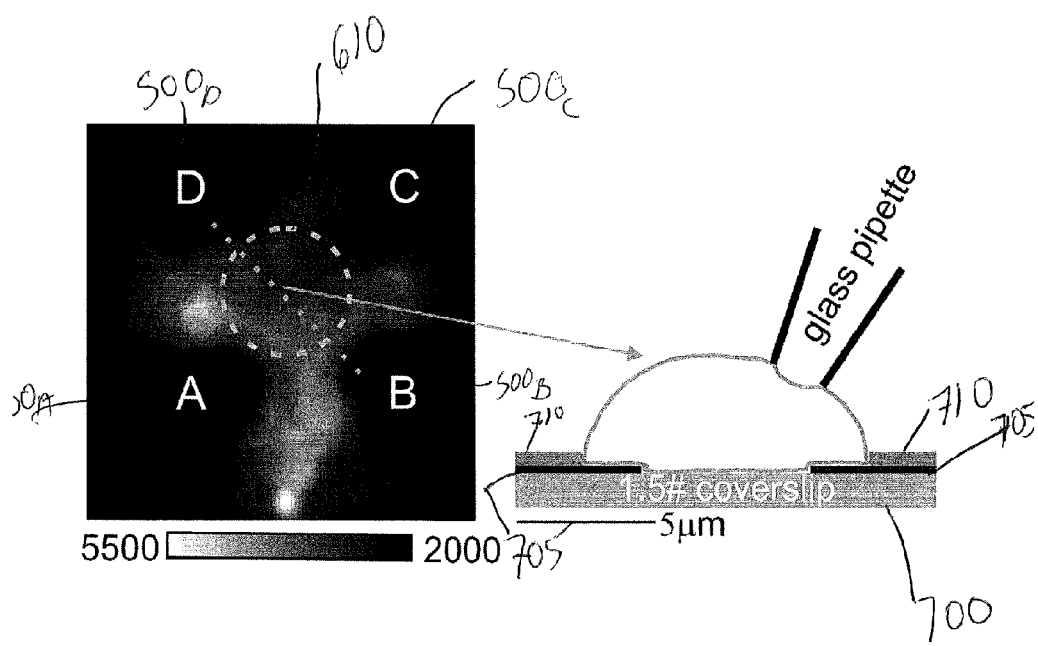
FIG. 6 illustrates an example of a fluorescence footprint of a cell expressing SCORE which is placed on the electrode array.
FIG. 7 illustrates a cross sectional view of the electrode array along the dotted line of FIG. 6.

The electrode array 500 can be microfabricated by contact photolithography, patterning 4 Pt electrodes on a glass coverslip (shown in FIG. 7 as 700) with a space of ~5 μm between them. A 5 μm legend is depicted in FIG. 7. However, the spacing can vary depending on a size of the sample. The electrode array 500 is located between the glass coverslip 700 and the cell membrane.

FIG. 6 illustrates an example of a fluorescence footprint of a cell expressing SNARE Complex Reporter (SCORE) which is placed on the electrode array 500. The fluorescence footprint was generated using a light source of approximately 436 nm. FIG. 6 represents an average of 1000 exposures without subtracting for a background. For descriptive purposes the electrodes have been labeled A-D in FIGS. 5 and 6. The bottom of FIG. 6 shows the intensity scale for the pixels. The intensity of each pixel can be digitized giving a value between a minimum and a maximum value, e.g., gray scale level. The level depends on the number of bits in the A/D conversion. FIG. 6 depicts a 14 bit A/D conversion, e.g., values between 0 and 16383. However, different A/D conversion bits can be used, e.g. 0 to 255.

Like FIG. 5, the electrode array 500 is depicted in black. The average fluorescence in a circular area between the electrodes (dashed circle 610) with ~2.5 µm radius can serve as control for measurements at release sites.

FIG. 7 illustrates a cross sectional view of the electrode array 500 along the dotted line of FIG. 6. As depicted in FIG. 7, the heights of the electrode (depicted as back and labeled) 705 can be varied as well. For example, the height of the electrodes can be 150 nm. Above the electrodes, an insulation layer(s) can be formed 710. For example, the insulation layers can be 300 nm thick. The cells and electrode array 500 are placed in a solution (not shown). For example, the solution can contain (in mM) 140 NaCl, 5 KCl, 5 $CaCl_2$, 1 $MgCl_2$, 10 Hepes/NaOH, and 20 glucose.

Figure 8:
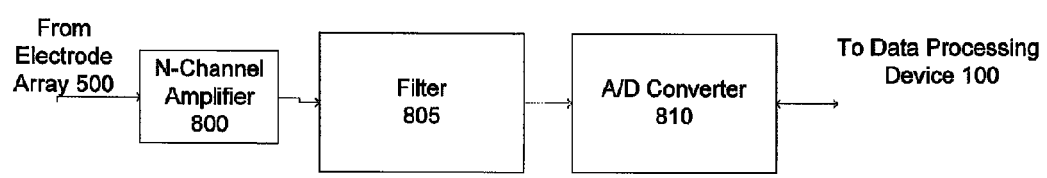
FIG. 8 illustrates a block diagram of an example of a signal conditioning system in accordance with aspects of the disclosure.

FIG. 8 illustrates a block diagram of an example of a signal conditioning system used for initially processing signals output from the electrode array 500.

Signals from each electrode (e.g., $500_{A-D}$) can be amplified for further processing by an N-Channel Amplifier 800. The electrodes 500 are electrically coupled to the N-Channel Amplifier using photoresist-insulated wires coupled to a contact pad.

The number of channels for the amplifier is the same as the number of electrodes. For example, a four-channel amplifier model number VA-10M4, manufactured by NPI Electronic GmbH, Tamm, Germany can be used. Each amplified signal can be filtered by a Filter 805. For example, a 500 Hz filter can be used. The Electrode Array 500 outputs an analog signal. The analog signal is converted into a digital signal for further processing by the Data Processing Device 100 by an A/D Converter 810. A 16-bit A/D converter can be used. The sample rate can vary. For example, a sample rate of 1 kHz made be used. The signals received from the Signal Conditioning System can be analyzed by the Data Processing Device 100 using any of the above described configured environments, tools and packages.

Although, the Signal Conditioning System is described separately from the Data Processing Device 100, the some components can be included in the Data Processing Device 100. Additionally, the signals from the electrode array 500 can be digital filtered.

Figure 9:
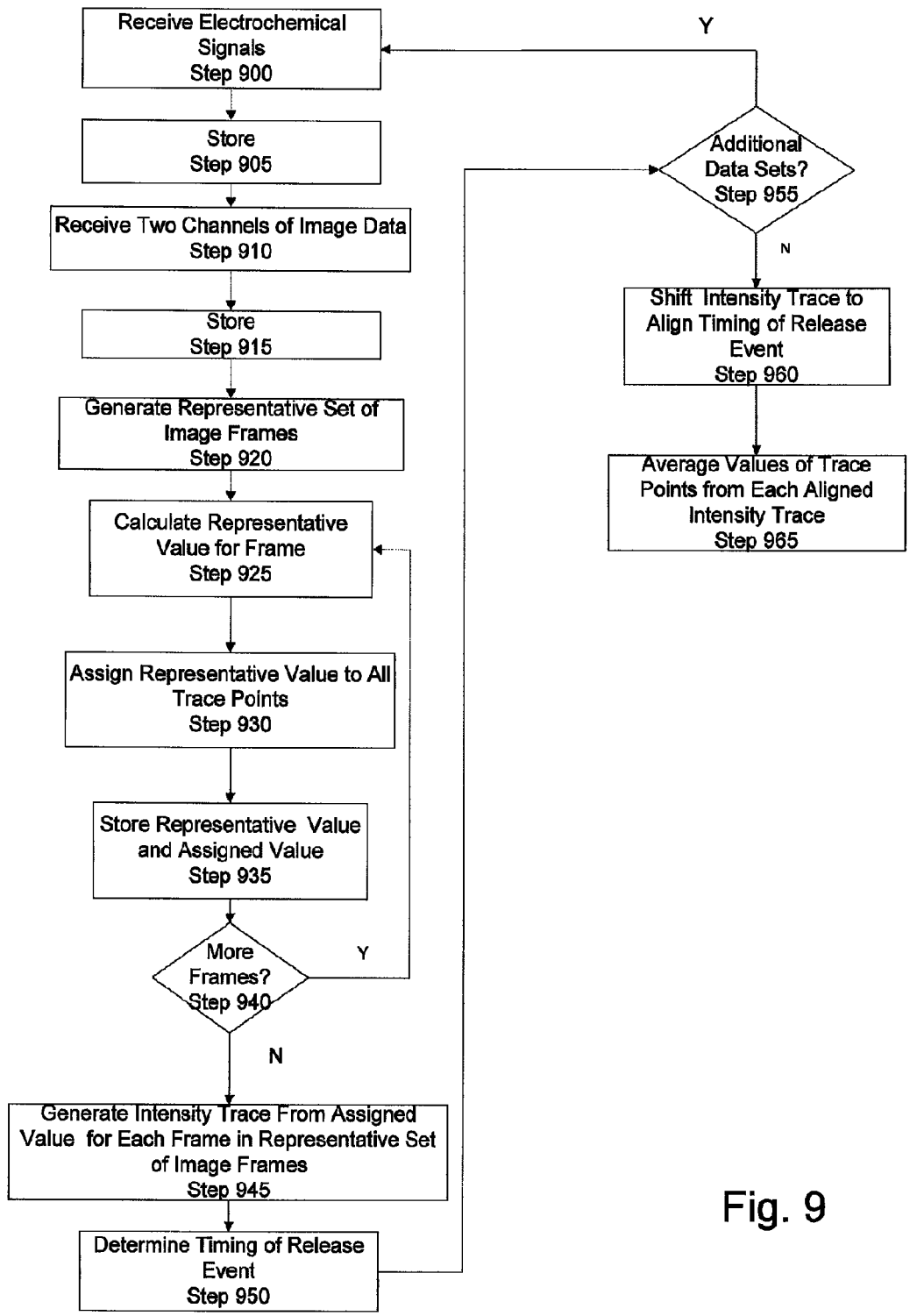
FIG. 9 illustrates a flow diagram for a method of obtaining high time resolution data from low time resolution image frames in accordance with aspects of the disclosure.

FIG. 9 illustrates a flow chart for a method of obtaining high time resolution data from low time resolution image frames from an imaging source in accordance aspects of the disclosure.

The data from the EMCCD 460 and the data from the electrode array 500/signal conditioning system are simultaneously recorded. The light from the Light Source 405 is turned on, the light traverses the Illumination Section 470, a Microscope 423 (and sample with cell), a Beam Splitting Section 480 and arrives at the EMCCD 460 in two channels. Simultaneously, a photocurrent is detected by the electrode array 500 as the light is emitted through the sample.

Data from the EMCCD 460 and the electrode array 500/signal conditioning system is recorded for a period of interest. The period of interest includes a time before the Light Source 405 is turned on and a time after. The EMCCD 460 generates image data for image frames. The frame rate for the image frame is a sum of the exposure time and the readout time. For example, if the exposure time is 200 ms and the readout time is 19 ms, one image frame represents 219 ms of time and set of new frames is generated every 219 ms. Since there are two channels of images, two frames are simultaneously recorded, one for each channel and the EMCCD 460 generates image data for each channel. The number of frames generated by the imaging source 460 depends on the period of interest. For each channel, image data for a plurality of frames is generated. A plurality of frames in the same channel is referred to as a set of image frames. Since there are two channels, there are two sets of image frames.

The electrode array 500/Signal Conditioning System generates data continuously over the period of interest.

A plurality of data sets is iteratively generated, repeatedly turning on and off the Light Source 405. The plurality of data sets generates a plurality of imaging events.

At step 900, the Data Processing Device 100 receives the electrochemical signals, e.g., current values, detected by each electrode 500A-D in the electrode array 500 via the Signal Conditioning System. For example, the Data Processing Device 100 receives four different continuously detected current values for the period of interest, one current value detected by an electrode, respectively. At step 905, the values are stored in the Persistent Storage 114, step 205. The values will be subsequently moved or copied to Working Data Storage 110 for processing.

At Step 910, the Data Processing Device 100 receives the two channels of image data from the EMCCD 460, e.g. two sets of image frames. As noted above, one channel represents emission in the CFP channel and the other represents emissions in the Venus channel. Each set of image frames contains a plurality of image frames over a period of interest. For example, the period of time can be 10 second before and after turning the light on from the Light Source 405.

At Step 915, the two channels of image data are stored in Persistent Storage 114. The image data will be subsequently moves or copied to Working Data Storage 110 for processing.

At Step 920, the Processor 105 generates a representative set of image frames from the two channels of image data. A FRET is determined from a ratio of the Venus channel/CFP channel. The plurality of image frames from the Venus channel and the plurality of image frames from the CFP channel are aligned in time. Pixel values for frames in the representative set of image frames are determined based on the relative intensities of corresponding pixels from corresponding frames in time in the Venus channel and CFP channels. For example, the image data is defined by gray levels. In an aspect of the disclosure, a background is subtracted from the gray levels of the image data from both channels. A ratio is subsequently calculated. In other aspects of the disclosure, the image data can be defined in other color spaces, such as RGB.

The pixel data for the representative set of image frames is stored in Working Data Storage 110. The representative set of image frames is dependent on an event of interest. For example, in a case where the comparison is between the CFP channel and the amperometrically detected data, such as release event, the representative set of image frames could be the plurality of image frames from the CFP channel. Other events of interest may use a sum of the image data from both channels.

At Step 925, the Processor 105 calculates a representative value for a frame of the representative set of image frames. During the first pass through Step 925, the Processor 105 calculates the representative value for the first frame. Successive times performing Step 925, the Processor 105 calculates the representative value for the next successive frame in the representative set of image frames. The representative value can be calculated as the mean of intensity value of a plurality of pixels proximate to a ROI, the highest intensity value of the plurality of pixels proximate to the ROI, and the mode of the intensity value of the plurality of pixels proximate to the ROI.

The number of pixels used and the location of the pixel can be determined based on a determined location of the single vesicle release event (or any other simultaneously recorded event).

At step 930, the Processor 105 assigns the calculated representative value to all trace points within the exposure time of the image frame and a portion of a readout time before exposure time of the image frame and a portion of the readout time after the exposure time. The exposure time is determined from TTL signals received concurrently with the two sets of image frames from the imaging source. The TTL signal is indicative of the exposure time.

In an aspect of the disclosure, the portion can be 50% of both the readout time before and after the exposure time. In another aspect of the disclosure, the portion of the readout time before and the portion of the readout time after do not have to be equal. However, the sum of the two portions, before and after, should equal the total readout time between successive exposures. Therefore, the representative value is assigned to trace points having time duration of the frame rate.

At step 935, representative values and the trace values assigned for the image frame are store in the Working Data Storage 110. While, FIG. 9 illustrates that the data being stored in step 935 for description purposes, the data can be stored in the Working Data Storage 110 after the respective steps.

At step 940, the Processor 105 determines if there are unprocessed frames in the Working Data Storage 110. If the Processor 105 determines that there are unprocessed frames (Y at step 945), the Processor 105 returns to step 925 and repeats Steps 925-940. Steps 925-940 are repeated for each frame in the representative set of image frames.

If the processor 105 determines that there are no unprocessed frames remaining (N at step 940), the processor 105 generates an intensity trace for the representative set of image frames at Step 945.

At step 950, the Processor 105 retrieves the trace values for each image frame of the representative set of image frames, from the Working Data Storage 110. The Processor 105 aggregates the trace values in time beginning with the first image frame and continuing with each successive frame to generate the intensity trace. The intensity trace is stored in the Working Data Storage 110. The intensity trace can also be displayed on a display 125.

At step 950, the Processor 105 determines the timing of the release event, e.g., reference event, from the current values, detected by each electrode 500A-D and which were received and stored.

The amplitudes of the spike depend on a diffusion distance between the release site and the respective electrode. The largest and earliest signal comes from the electrode closest to the release site. It reports the time when the vesicle's cargo is released (the "spike starting time"), e.g., when the fusion pore dilates explosively, as well as the type of release event. An amperometric foot signal (AFS) spike is indicative of slow catecholamine release through a narrow fusion pore. The foot duration reports the delay between opening of a narrow fusion pore and its subsequent dilation. In a non-AFS spike, the spike rises abruptly to a peak and declines, as a fusion pore opens, immediately dilates, and allows the rapid escape of catecholamine.

Figures 12, 13:
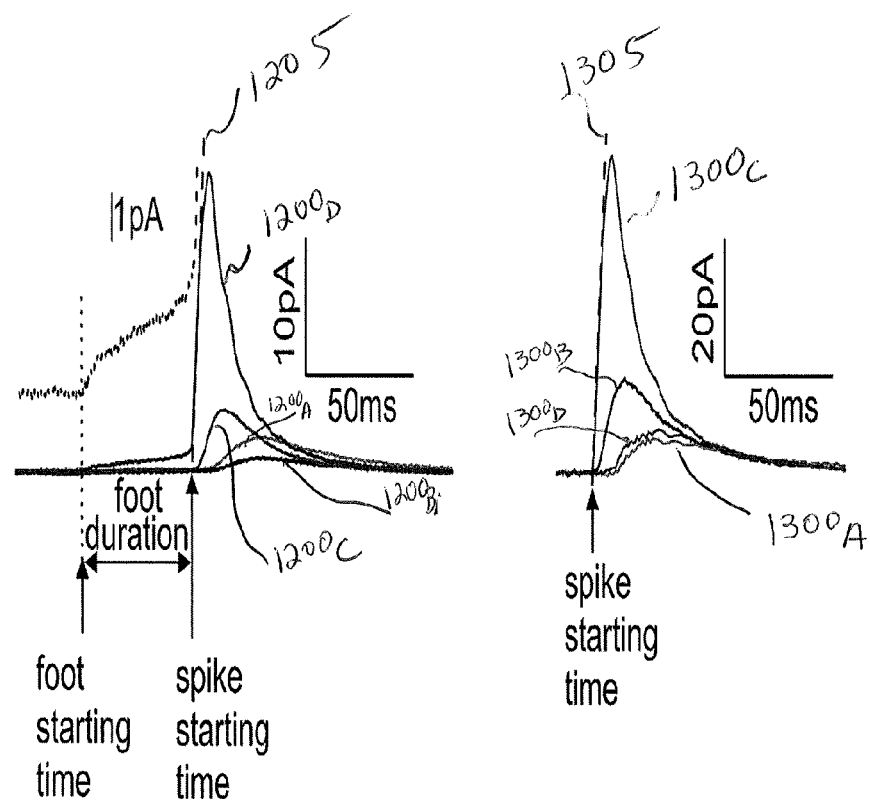
FIGS. 12 and 13 illustrate currents recorded by electrodes of an electrode array depicted in FIG. 5.

In an aspect of the disclosure, the timing of the release event is based on the change of the current intensity over time, e.g., a time derivative. The first and largest spike is examined to determine the time of the release event. Initially, a baseline current is determined and a time of the maximum spike ($T_{max}$). Then, the amplitude of the maximum current ($I_{max}$) is determined along with a half width ($t_{1/2}$) and a charge Q. A risetime and slope thereof are derived from a linear fit of the current between two points (upper and lower point) on the rising portion of the spike. The upper point is less than 90% $I_{max}$ to prevent the inclusion of the upper portion of the spike, which may have been flattened or adjusted by filtering. The lower point can be between 20%-50% of the $I_{max}$. This avoids including the foot. For example, the spike starting time can determined by extrapolating a linear fit of a 50%-90% rising phase back to the baseline. The linear fit lines are indicated by a dashed line along the first detected spike, in time, in FIGS. 12 and 13. FIGS. 12 and 13 will be described later when discussing the results of an experiment applying aspects of the disclosure. Other methods of determining the spike starting time can be used such as methods described in Analysis of Exocytotic Events Recorded by Amperometry, E. Mosharov et al., Nature Methods, Vol. 2 No. 9, September 2005, pp. 651-658, the entirety of which is incorporated by reference.

At step 955, a determination is made if there are additional unprocessed data sets. In an embodiment, 1000 data sets are generated by the EMCCD 460 and electrode array 500/signal conditioning system, respectively.

If there are additional data sets ("Y" at step 955), steps 900-950 are repeated for each additional sets of data. If all of the data sets are processed, (e.g., "N" at step 955), the process proceeds to step 960.

The Processor 105 retrieves the intensity trace for each set of the representative image frames and the corresponding timing of the release event (e.g., reference event) for the data set from the Working Data Storage 110.

At Step 960, the Processor 105 shifts, in time, the intensity trace for each set of the representative image frames to align the timing of the release event for each intensity trace. An intensity trace may not need to be shifted in time if the release event already is aligned with the release event in other intensity traces. Each individual intensity trace will be desynchronized with respect to each other, but aligned with respect to the timing of the release event.

At Step 965, the Processor 105 averages the trace values for each of the aligned trace points from each of the shifted intensity trace. For example, if there are 1000 data sets (1000 intensity traces), the Processor 105 averages the trace values for the 1000 trace points which are aligned in time. The average trace values are used to create an average continuous intensity trace for the time period of interest. The average continuous intensity trace has the same resolution and the high time resolution data.

This average continuous intensity trace is stored in the Working Data Storage 110. Additionally, the average continuous intensity trace can be displayed on a display 125. The average continuous intensity trace can also be stored in Persistent Storage 114.

Figure 10:
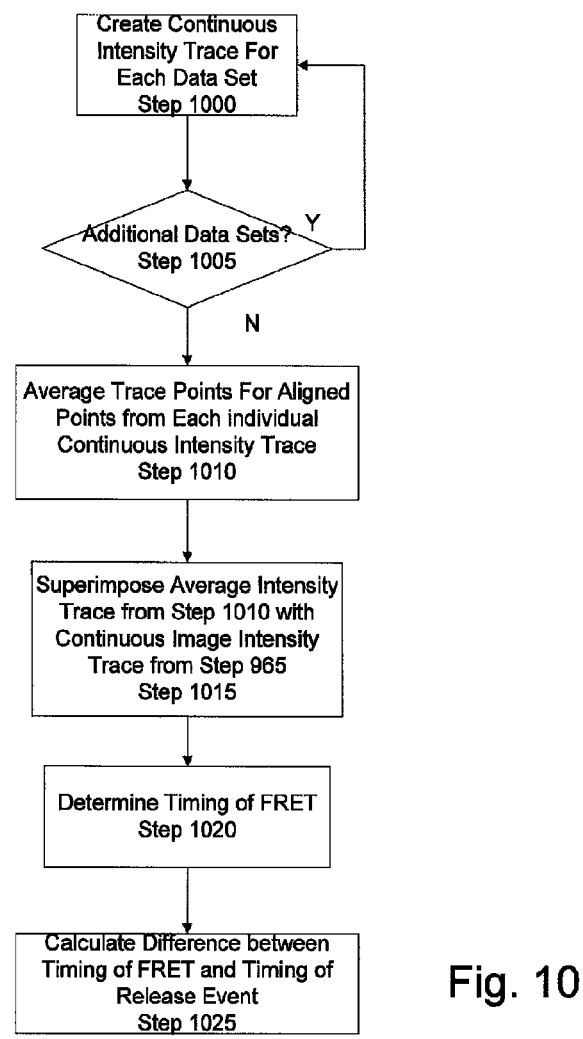
FIG. 10 illustrates a flow chart for a method of comparing timing of a single vesicle release event and a Fluorescence Resonance Energy Transfer in accordance with aspects of the disclosure.

FIG. 10 illustrates a flow chart for a method of comparing the timing of the release event with the timing of a FRET.

At Step 1000, the Processor 105 creates a continuous intensity trace for sets of data from the electrode array/signal conditioning system.

The current data measured by the closest electrode in the electrode array to the release event over the time period of interest is used as the trace values, e.g., the electrode that was used to determine the timing of the release event.

While FIG. 10 describes certain steps separately, the functionality described therein can be performed concurrently with the steps described in FIG. 9. For example, when the Processor 105 is determining the timing of the release event, the processor 105 can create the continuous intensity trace (Step 950). The continuous intensity trace for each set of data from the electrode array is also stored in Working Data Storage 110.

Step 1000 is repeated for each data set. At step 1005, a determination is made if there are additional unprocessed data sets. If there are additional unprocessed data sets ("Y" at step 1005), step 1000 is repeated for each unprocessed data set. If all of the sets of data from the electrode array are processed, (e.g. "N" at step 1005), the process proceeds to step 1010.

The Processor 105 retrieves each continuous intensity trace from the Working Data Storage 110. At step 1010, the Processor 105 generates an average image intensity trace for the all of sets of data from the electrode array (each iterative recording). Each continuous intensity trace is shifted to align the timing of the release event in each continuous intensity trace.

While step 310 is described separately, when the Processor 105 shifts the traces in step 960 to align the timing of the release event (the data for which simultaneously recorded), the Processor 105 can also generate the average continuous intensity trace for the sets of data from the electrode array.

At step 1010, the Processor 105 averages the trace values for the aligned trace points from each of the individual continuous intensity traces. For example, if there are 1000 data sets (1000 continuous intensity traces), the Processor 105 averages the trace values for the 1000 trace points which are aligned in time. The average trace values are used to create an average continuous intensity trace.

The average continuous intensity trace is stored in the Working Data Storage 110. Additionally, the average continuous intensity trace can be stored in the Persistent Storage 114.

At Step 1015, the Processor 105 superimposes the average continuous intensity trace created for the imaging events (e.g., FRET) with the average continuous intensity trace created for the sets of data from the electrode array. The superimposed traces can be displayed on the display 125.

At Step 1020, the Processor 105 determines a timing of an event of interest, e.g., FRET. The average continuous intensity trace (of the imaging data) is used to determine timing of a FRET. The average continuous intensity trace for the imaging events, e.g., FRET time course, is characterized by a gradual increase of the trace value over the time span of two frame rates. In an aspect of the disclosure, the timing of an event, e.g., a FRET, is determined based on a time of the half maximum trace value (e.g., the time where the trace exhibits an amplitude of 50% of the maximum intensity amplitude) for the average continuous intensity trace. The average continuous intensity trace can be fitted with a step response function. In another aspect of the disclosure, the timing of the event, e.g., FRET, is determined based on the trace values of the step function fit to the average continuous intensity trace.

At Step 1025, the Processor 105 calculates the difference between the timing of the event and the timing of the release event.

The average continuous intensity trace for the FRET can be compared with a theoretically continuous intensity trace, e.g., step function. For a sequence frames with exposure times $t_e$ and a readout time $t_{gap}$, a step response function $f$ of the averaged traces obtained from steps with fixed amplitude A at time $t_0$ can be calculated theoretically and can be expressed as follows:

$$\text{if } t < t_0 - t_e - \frac{t_{gap}}{2} \qquad f = 0$$

$$\text{if } t_0 - t_e - \frac{t_{gap}}{2} < t < t_0 - \frac{t_{gap}}{2} \qquad f = A \cdot \frac{\left[t_e + \frac{t_{gap}}{2} + (t - t_0)\right]^2}{2 \cdot (t_e + t_{gap}) \cdot t_e}$$

$$\text{if } t_0 - \frac{t_{gap}}{2} < t < t_0 + \frac{t_{gap}}{2} \qquad f = A \cdot \left[\frac{1}{2} + \frac{t - t_0}{(t_e + t_{gap})}\right]$$

$$\text{if } t_0 + \frac{t_{gap}}{2} < t < t_0 + t_e + \frac{t_{gap}}{2} \qquad f = A \cdot \left\{1 - \frac{\left[t_e + \frac{t_{gap}}{2} - (t - t_0)\right]^2}{2 \cdot (t_e + t_{gap}) \cdot t_e}\right\}$$

$$\text{if } t > t_0 + t_e + \frac{t_{gap}}{2} \qquad f = A$$

Figure 11:
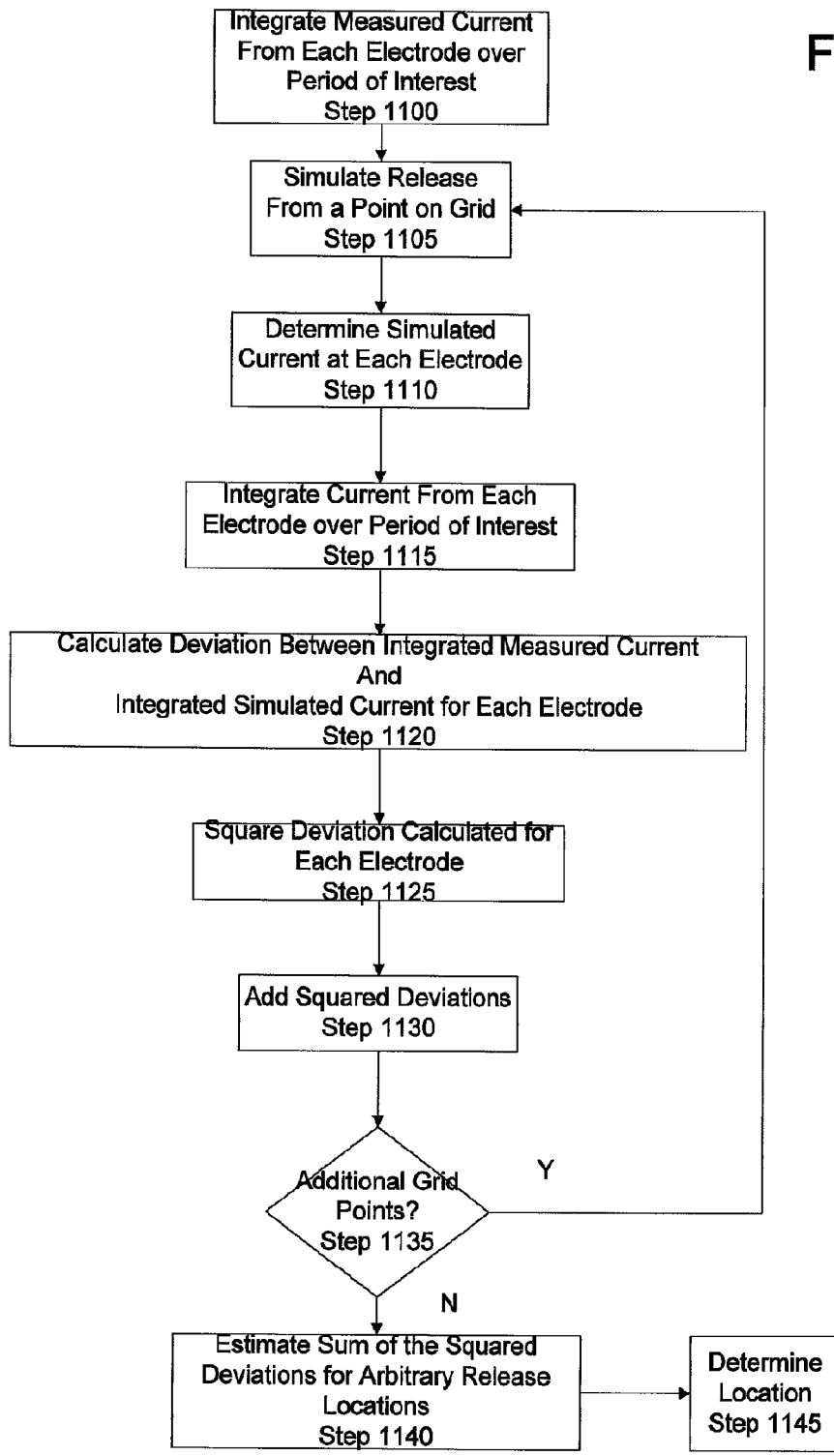
FIG. 11 illustrates a flow chart for a method of determining the location of a single vesicle release event in accordance with aspects of the disclosure.

FIG. 11 illustrates a flow chart for a method of determining a location of the release site. The location of the release site can define an ROI for the calculating the representative value of an image frame including determining the location and number of pixels used for the calculation. Precise determination of the site is important to correlate the FRET signals with a single exocytic event, e.g., release event.

Molecules released from a chromaffin granule diffuse isotropically in the space between cell membrane and coverslip as indicated by fluorescence imaging.

When a cell is placed in the space between surface patterned electrodes (see FIG. 6) a certain fraction of the catecholamine molecules released in a single exocytic event will be detected by the different electrodes, e.g., $500_{A-D}$, depending on the distance of the particular electrode from the release site with the largest fraction being oxidized at the electrode closest to the release site.

The location is determined based on a series of comparisons between stimulated integrated current values over time, from different potential release locations (of each electrodes in the electrode array) and measured integrated current values over time (from the same electrodes in the electrode array).

At Step 1100, the measured, e.g., detected current values at each electrode $500_{A-D}$ is integrated over time by the Processor 105. FIG. 5 depicts four electrodes in the electrode array, and therefore, four different integrated current values over time are generated, one for each electrode. By integrating the currents, the charges corresponding to a number of molecules detected by each electrode are obtained.

Multiple release points on the grid (depicted in FIG. 5) are stimulated by the Processor 105. The simulation may or may not assume that the release from individual sites is instantaneous. Diffusion is modeled using Monte Carlo simulation. A predetermined number of molecules per vesicle is used for the simulation. For example, 100,000 molecules per vesicle can be used. Other simulation parameters include a diffusion coefficient and distance between cell membrane and electrode array, size of the cell and topology including the surface bottom. For a given distance r, between a simulated release event and an electrode, a 2-dimensional diffusion time is $r^2/4D$, where D is the diffusion coefficient. The distance r and the geometry of the electrode are determined by imaging.

The diffusion time reflects an average time of arrival of a molecule at the distance r. Spike starting time reflects an arrival of a first molecule.

At step 1110, the Processor 105 determines a simulated current for each electrode, e.g., electrodes 500$_{A-D}$. The simulated current is integrated over the same time as above by the Processor 105 at step 1115.

For example, four different integrated current values over time are generated, one for each electrode. For each electrode, the integrated currents (both simulated and measured) are compared to calculate a Deviation at step 1120. In the case of four electrodes, four different comparisons are made and four Deviations are determined by the Processor 105.

At step 1125, the Processor 105 squares each of the Deviations. For example, each of the four calculated Deviations is squared. At step 1130, the Processor 105 adds each of the squared Deviations to generate a sum of the squared Deviations (S). For example, the four squared deviations are added together.

This process is repeated for each grid point used to simulate a release, e.g. steps 1105-1135. For example, a 20×20 grid points can be used. The spacing can be 500 nm. However, a larger or smaller number of grid points can be used with smaller or larger spacing. Steps 1105-1135 are repeated for each of the 20×20 grid points. At step 1135, the Processor 105 determines if there are any other grid points for simulating a release site. If there are other grid points for simulating a release site ("Y" at step 1135), the Processor 105 returns to step 1105; otherwise, the process moves to step 1140.

In reality, the release location does not usually fall exactly on a grid point as shown in FIG. 5, but somewhere in between four grid points, e.g., four lattice points. At step 1140, the Processor 105 estimates the simulated fractional charges for arbitrary release locations by linear interpolation of the simulated fractional changes using the four lattice points surrounding the arbitrary release location. Steps 1105-1130 are performed for the arbitrary release locations to estimate the sum of squared Deviations (S) for each arbitrary release location.

S is used to determine the location of the actual release site. At step 1145, the position of the recorded exocytic event, e.g., release site is determining by fitting the release location to give a best fit minimizing S.

Experimental Results

FRET and Single Release Event Experiment

An experiment was conducted to determine the temporal relation between a FRET increase and a release event.

The experiment used aspects of the disclosure to obtain high time resolution data from low time resolution image frames and subsequently compare the obtained data with simultaneously recorded data. The image data was obtaining using a total internal reflection (TIR) fluorescence system as described in FIG. 4 and an electrode array as illustrated in FIG. 5 and a signal conditioning system as depicted in FIG. 8. The signal conditioning system included an A/D converter board which, was connected to the Data Processing Device 100.

The sample used in the experiment included the DNA of SCORE which was subcloned into a viral vector pSFV1 (Semliki Forest, Invitrogen). Bovine chromaffin cells were prepared in accordance with the method described in T. D. Parsons et al., Docked Granules, the Exocytic Burst, and the Need for ATP Hydrolysis in Endocrine Cells, Neuron 15, 1085-1096 November 1995, the entirety of the description of which is incorporated herein by reference.

Illumination was provided by a mercury arc lamp (X-Cite®, 120PC) through a 436/10 nm excitation filter and a 455 dichroic. The fluorescence image was separated into CFP and Venus components with an image splitter (Dual View™, by Optical Insights, LLC) fitted with a 505 nm dichroic, and emission filters at 465-495 nm for the CFP channel and 520-550 nm for the Venus channel. For each recording, a 1000 frame image sequence was collected with 200 ms exposure time and 19 ms readout interval using an EMCCD camera (iXon series by Andor Technology plc) and its accompanying software such that one frame was acquired every 219 ms simultaneously for both channels. The image data was input to the Data Processing Device 100 via a PCI controller card. The Data Processing Device contained a program for performing the functionalities described herein.

A Zeiss Axiovert 135 TV microscope was equipped with a Zeiss Plan-Fluar 1.45 NA 100X oil objective and was modified for objective-type evanescent-field illumination. The Objective was below the sample, e.g., inverted.

A bovine chromaffin cell expressing SCORE was picked up with a micropipette and gently pressed onto the space between electrodes as depicted in FIG. 7. Experiments were performed in a solution containing (in mM) 140 NaCl, 5 KCl, 5 CaCl$_2$, 1 MgCl$_2$, 10 Hepes/NaOH, and 20 glucose. A TLL signal from the EMCCD was used to determine the exposure time for each frame. The TTL signal was used to determine the start and end time of the exposure portion of each frame to assign the representative value to trace points during the exposure time and a portion of the readout time before and after the exposure time. The TTL signal can also be used to identify the frame in which the spike occurred.

FIGS. 12 and 13 illustrate amperometric currents recorded by the 4 electrodes of an electrode array 500. Each figure depicts 4 intensity traces for a portion of the time period of interest. The dashed curve shows a portion of intensity trace 1200$_D$ on an expanded vertical scale. In FIG. 12, the intensity traces are labels 1200$_{A-D}$ to correspond with the electrode labels. The legend to the right of the intensity traces illustrates the scale in time and amplitude. The spike starting time is labeled and was determined using the linear best fit (identified by dashed line 1205) as described above. The foot duration is labels and illustrated by a double arrow. The foot starting time was taken as the first point that exceeds the baseline current noise by >2 standard deviations and the foot duration as the time interval from foot starting time to spike starting time. FIG. 12 illustrates an AFS-spike.

FIG. 13 illustrates a non-AFS spike. Native' foot signals with duration shorter than 33% of the 50%-90% rise time were categorized as non-AFS events. In FIG. 13 the intensity traces are labels 1300$_{A-D}$ to also correspond with the electrode labels. The legend to the right of the intensity traces illustrates the scale in time and amplitude. The spike starting time is labeled and was determined using the linear best fit (identified by dashed line 1305) as described above.

Figure 14:
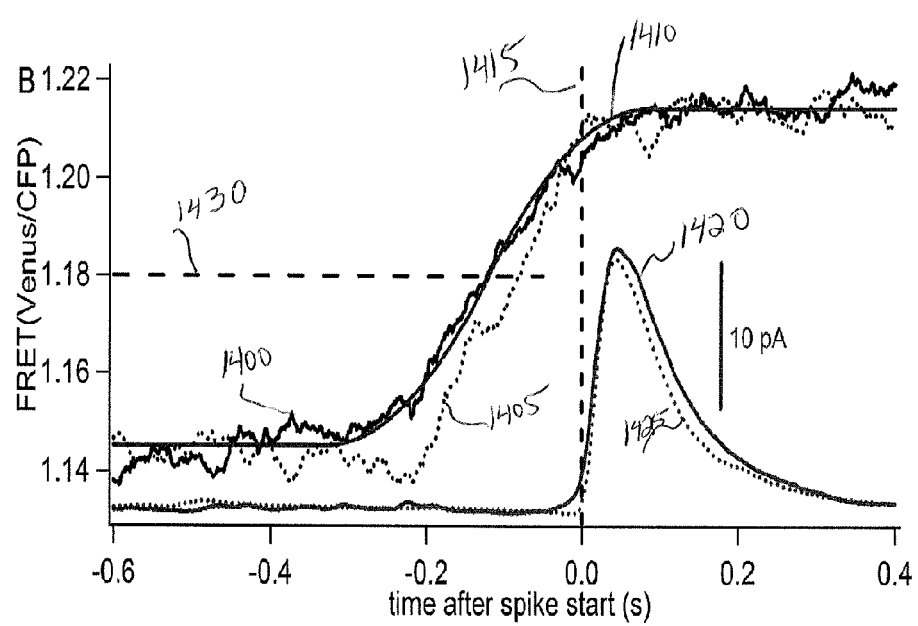
FIG. 14 depicts average continuous intensity traces determined in accordance with aspects of the disclosure.

FIG. 14 depicts average continuous intensity traces for both the imaging event (e.g., FRET) and average amperometric spike (release event) as a result of the experiment. The average continuous intensity traces were for 903 aligned spikes and imaging events. In the experiment, the spike can be considered the reference event or the high time resolution data and the image data can be considered the low time resolution data.

Each individual intensity trace for the imaging event was aligned with respect to the timing of the spike.

The dark wavy line 1400 depicts an average continuous intensity trace for an AFS and the dotted wavy line 1405 depicts the average continuous intensity trace for a non-AFS, both determined in accordance with aspects of the disclosure. The solid smooth line 1410 depicts a continuous intensity trace for a theoretical continuous intensity trace, e.g., a step response function. The step response function in FIG. 14 is with a fixed delay.

The vertical dash line indicates the spike starting time (t=0) (identified as 1415). The solid lighter colored line 1420 depicts the average amperometric spike of the AFS and the dotted lighter colored line 1425 depicts the average amperometric spike of the non-AFS.

The horizontal dashed line indicates the 50% FRET change levels, e.g., 50% of maximum intensity (identified as 1430).

FIG. 14 reveals a clear delay between the FRET change and the spike. A delay of 91±1 ms between FRET change for an AFS event and the onset of the amperometric spike (t=0) indicating the time of fusion is shown. A delay of 120±1 ms between FRET change for an AFS event and the onset of the amperometric spike (t=0) indicating the time of fusion is shown. The delay is 30 ms longer for the AFS events than the non-AFS events.

Evidently, the FRET change is temporally correlated with the opening of the fusion pore and not its dilation. It thus indicates a conformational change in the SNARE complex that leads to subsequent fusion of the vesicle.

FIG. 15 depicts average continuous intensity traces for both the imaging events (e.g., FRET) and average amperometric spike (release event) as a result of the experiment (similar to FIG. 14). The average continuous intensity traces were for 903 aligned spikes and imaging events. The average continuous intensity trace for the imaging events 1500 was fitted to two step response functions 1505 and 1510 in accordance with the disclosure. The step response function 1505 is with a fixed delay (similar to FIG. 14). The step response function 1510 is with a convolution of step response with exponential distribution of 128 ms time constant. The vertical dash line indicates the spike starting time (t=0) (identified as 1520). The solid lighter colored line 1515 depicts the average amperometric spike.

FIG. 16 depicts squared deviations of the two fitted step response functions to the average continuous intensity trace. Deviation 1600 corresponds to step response function 1505 and Deviation 1605 corresponds to step response function 1510.

The FRET change in FIG. 15 is abrupt. If fusion followed a step in FRET with first-order kinetics, then the delays between FRET change and spike starting time would be exponentially distributed, and the step response function must be convolved with that exponential distribution (step response function 1510). A delay of 90 ms (the time of 50% maximum intensity) was obtained with an exponential time constant T=128 ms using the step response function 1510. However, the rising phase of the step response function 1510 is shallower and does not fit the average continuous intensity trace 1500 as well as the step response with fixed delay (step response function 1505) with a 2.5-fold increase of $\chi^2$. The data is better explained if FRET changes in a step followed by fusion with a fixed delay of approximately 90 ms.

Figure 17:
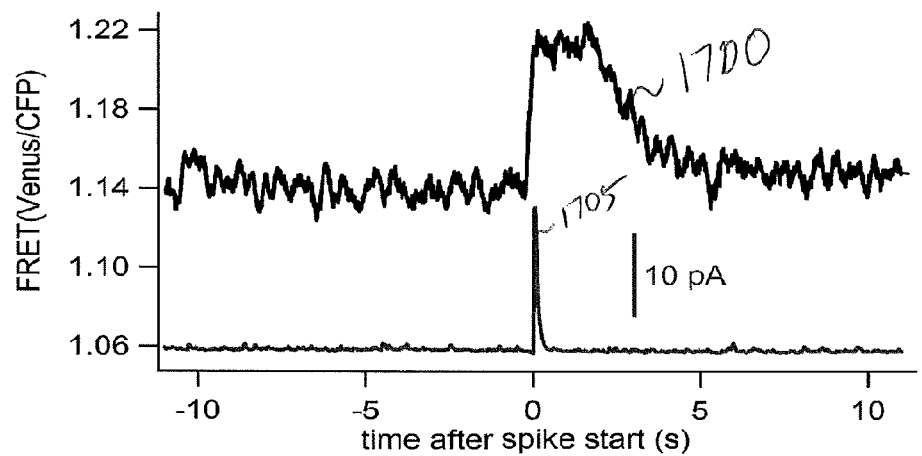
FIG. 17 illustrates an average continuous intensity trace determined in accordance with aspects of the disclosure from image data simultaneously recorded with 903 amperometric spikes with no detectable foot signal and an average continuous intensity trace determined in accordance with aspects of the disclosure from measured current data of the same 903 amperometric spikes.
Figure 18:
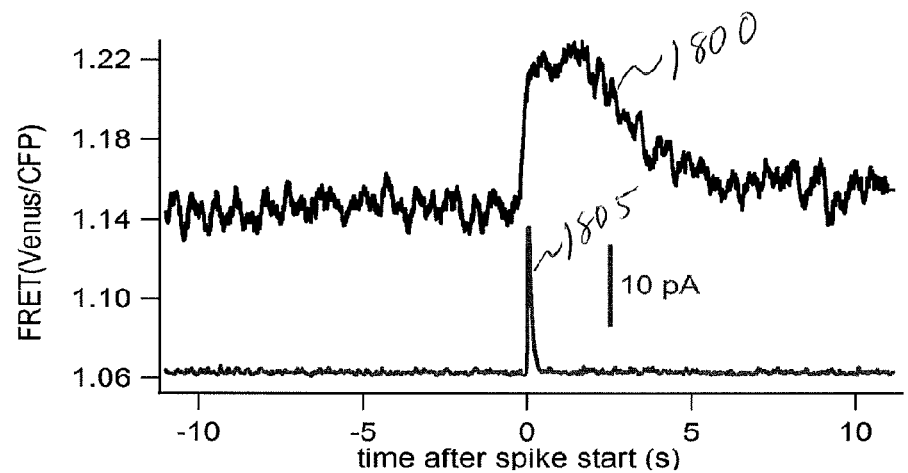
FIG. 18 illustrates an average continuous intensity trace determined in accordance with aspects of the disclosure from image data simultaneously recorded with 581 amperometric spikes that showed a detectable foot signal and an average continuous intensity trace determined in accordance with aspects of the disclosure from measured current data of the same 581 amperometric spikes.

FIGS. 17-18 depict continuous intensity traces for both the imaging events (e.g., FRET) and average amperometric spike (release event) as a result of the experiment. FIG. 17 illustrates a average continuous intensity trace 1700 determined in accordance with the disclosure from image data simultaneously recorded 903 amperometric spikes with no detectable foot signal. Spikes 1705 were aligned at time of onset (t=0). FIG. 17 illustrates an extended view of the corresponding intensity traces from FIG. 14. In FIG. 17, the period of time is 10 seconds before and after the spikes.

FIG. 18 illustrates an average continuous intensity trace 1800 determined in accordance with the disclosure from image data simultaneously recorded with 581 amperometric spikes that showed a detectable foot signal. Spikes (green) 1805 were aligned at the transition point from foot signal to spike (t=0). The legend in both FIGS. 17-18 depicts the amplitude scale. The period of time for the observation was 10 seconds before and after the spikes.

The location of the release site was determined by fitting the release location to give a best fit minimizing a sum of squared deviations S between simulated and measured fractional charges for the 4 electrodes. The simulated values were determined by Random Walk Simulation (RWS). The coordinates of the electrodes were determined from the geometrical outline of the electrodes was obtained from imaging. The distance between the cell membrane and electrode array surface was set to 0.1 μm and the diffusion coefficient=90 μm$^2$/s. The simulation zone was within the 500 nm grid as depicted in FIG. 5. Random Walk Simulations (RWS) were performed to determine the fractional charges measured by the individual electrodes for release sites within the simulation zone. The simulation produces a unique current for each electrode. These currents were integrated as described above.

Figure 19A:
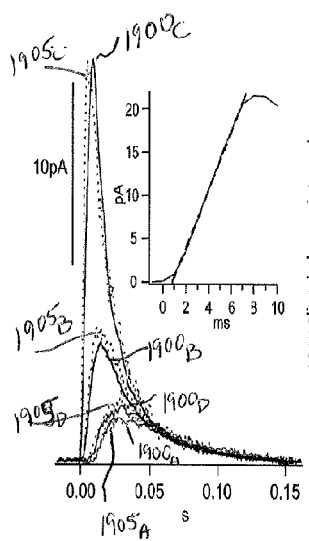
FIG. 19A illustrate detected current values (solid lines) at each of the electrodes within an electrode array and a simulated current value (dashed lines) at each of the electrodes within the electrode array from a potential release point on a grid.
Figure 19B:
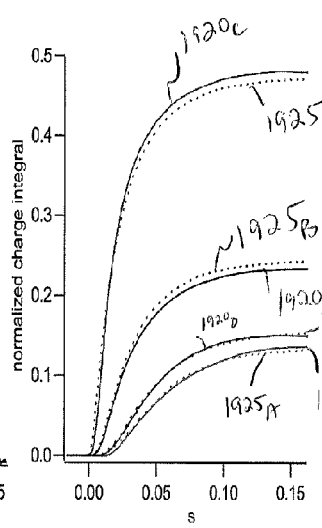
FIG. 19B illustrates an integrated current for the detected currents depicted in FIG. 19A and for the simulated currents depicted in FIG. 19A.
Figure 19C:
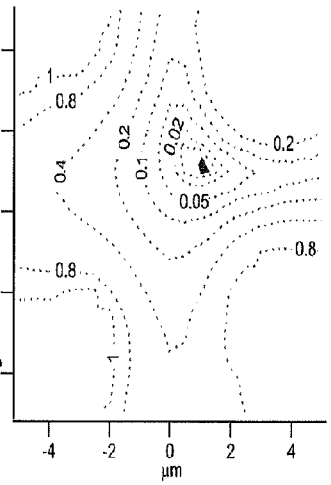
FIG. 19C is a contour graph showing a determined location of a single vesicle release event in accordance with aspects of the disclosure based on simulated values and measured values, where the values depicted are a root of a sum of squared deviations between measured and simulated charge ratios at different electrodes as a function of position.

FIG. 19A illustrate the detected current values at the electrodes 1900A-D (solid) and the simulated current value at the electrodes 1905$_{A-D}$ (dotted) for one potential release site. FIG. 19B illustrates the integrated current 1920$_{A-D}$ for the detect currents and for the simulated currents 1925$_{A-D}$ from FIG. 19B. FIG. 19C is a contour graph. The contour graph showing the root of the sum of squared deviations between measured and simulated charge ratios as a function of X and Y positions. The deviation at the determined releasing site (dark mark) of the release event is 0.003.

The traces representing imaging events in FIGS. 14-18 were determined using pixel coinciding with the determined release site, e.g., 2×2 pixels from each frame. The representative value for each frame was generated using the pixel intensities for these pixels. The representative intensity value for a frame was assigned to all the trace values for trace points for the exposure time for the frame and half the readout time before and after the frame. This assignment was repeated for each frame to generate each individual intensity trace.

Shutter Opening Experiments

Other experiments were conducted in accordance with aspects of the disclosure. A coverslip was placed on a sample holder of an inverted microscope. The coverslip had an electrode array on its surface. The electrode array was connected to a signal conditioning system. The signal conditioning system was connected to a Data Processing Device, e.g., 100. Current was detected by the electrode array, e.g., 500. Illumination was provided by a mercury arc lamp (X-Cite®, 120PC) through a 436/10 nm excitation filter and a 455 dichroic. An EMCCD camera (iXon series by Andor Technology plc) and its accompanying software were used to capture images such that one frame was acquired every 219 ms. The EMCCD camera was coupled to the microscope via the connector. The whole camera image was analyzed for intensity to determine the representative value for a frame.

The image data was input to the Data Processing Device 100 via a PCI controller card. The Data Processing Device contained a program for performing the functionalities described herein.

A shutter opening produced a stepwise increase in light intensity. The increase light intensity initiated a photocurrent on the electrode array (e.g., 500) that marked the time of shutter opening. In the experiment, either the shutter opening or the detection of the photocurrent can be considered the reference event or the high time resolution event. The image data from the EMCCD camera can be considered the low time resolution event.

Figure 20A:
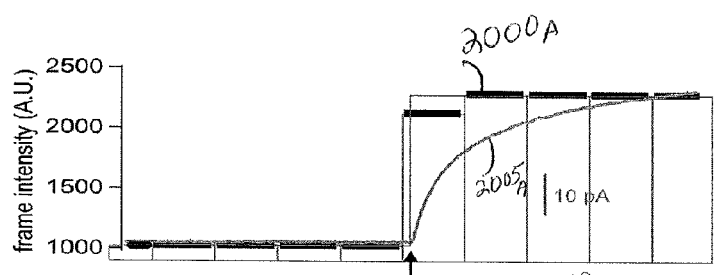
FIGS. 20A-20D illustrate results of a first shutter opening experiment in accordance with aspects of the disclosure.
Figure 20B:
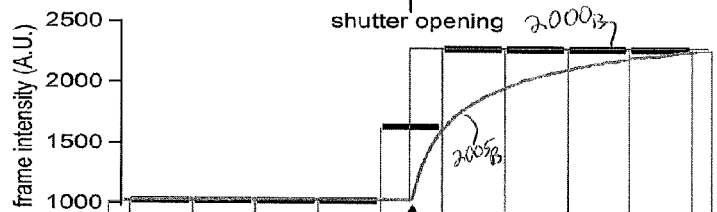
Figure 20C:
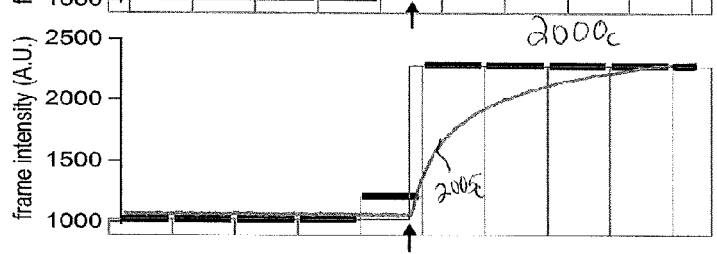

FIGS. 20A-20D illustrate the results of the shutter opening experiment. The imaging frame during which the shutter opens reports a brightness that depends on the precise timing of shutter opening during the frame. When the shutter opens shortly after the exposure begins, the brightness in this frame is high (FIG. 20A). When the shutter opens in the middle of the frame the brightness is 50% (FIG. 20B), and when the shutter opens near the end of the exposure, the intensity remains rather low (FIG. 20C).

The image intensity (calculated value) was assigned to each trace point within the exposure time and half of the readout time before and after the exposure time for the frame. In the shutter experiment, each trace point represents 1 ms of time. The traces for each imaging event $2000_A$-$2000_C$ (collectively 2000) were aligned with respect to the shutter opening, e.g., reference event. FIGS. 20A-20C illustrate the shutter opening with an arrow. FIGS. 20A-20C depict the intensity traces for the imaging events shifted in time to align the traces with respect to the shutter opening. FIGS. 20A-20C illustrate examples of individual intensity trace which have been shifted. The intensity trace for the detected current by the electrode array $2005_{A-c}$ is also depicted in FIGS. 20A-20C. When the frames for each imaging event are aligned with respect to the time of shutter opening (reference event) with sub-frame time resolution, as indicated by the onset of the photocurrents, the imaging frames from the different imaging events are desynchronized. The image intensity reflected in the intensity trace for the frames in FIGS. 20A-20C are given in arbitrary units. The frame intensity in FIG. 20D is normalized.

FIGS. 20A-20C illustrate three imaging events. The shutter experiment included 260 imaging events. FIG. 20D illustrates the average continuous intensity trace 2010 for the 260 imaging events. FIG. 20D also includes an average continuous intensity trace 2020 for the current detected by the electrode array, e.g., 500, simultaneously with each of the 260 imaging events. FIG. 20A illustrates a legend showing the scale for the magnitude of current. Image frame times are indicated by vertical lines in FIGS. 20A-20C and include 200 ms exposure time (black horizontal bars) and 19 ms inter frame interval.

Figure 20D:
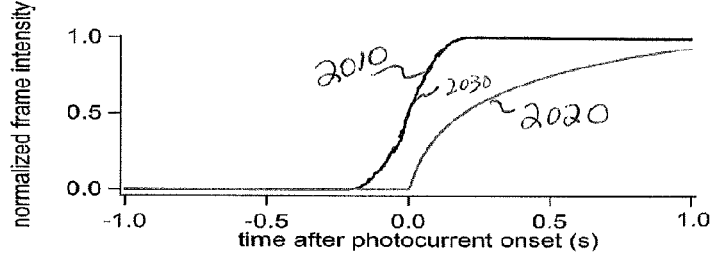

FIG. 20D also depicts a step response function 2030 fitted to the averaged continuous intensity trace 2020 for the 260 imaging events. FIG. 20D shows a 50% rise time at t=0±2 ms. The averaged continuous intensity trace is characterized by a gradual increase of the traces over the time span of two frames.

A second shutter experiment was conducted using a photodiode instead of the electrode array. FIGS. 21A-21D illustrate the results of the shutter opening experiment with the photodiodes.

A coverslip was placed on a sample holder of an inverted microscope. A photodiode was mounted on top of the coverslip to detect a light step change. The photodiode was connected to an A/D converter (e.g., a signal conditioning system without an amplifier). The A/D converter was connected to a Data Processing Device, e.g., 100. Illumination was provided by a mercury arc lamp (X-Cite®, 120PC) through a 436/10 nm excitation filter and a 455 dichroic. An EMCCD camera (iXon series by Andor Technology plc) and its accompanying software were used to capture images such that one frame was acquired every 219 ms. The EMCCD camera was coupled to the microscope via the connector. The whole camera image was analyzed for intensity to determine the representative value for a frame.

The image data was input to the Data Processing Device 100 via a PCI controller card. The Data Processing Device contained a program for performing the functionalities described herein.

Intensity traces for the intensity traces for the imaging events are labeled $2100_{A-C}$. The intensity traces of the measured voltage from the photodiode is labeled $2105_{A-C}$ The intensity traces for the measured voltage shows noise. The experiment did not attempt to filter the noise. However, the noise can be filtered out.

The average continuous intensity trace generated from 262 imaging events is labeled 2110. The average continuous intensity trace generated from 262 voltage measurements is labeled 2120. FIG. 21D also depicts a step response function 2130 fitted to the averaged continuous intensity trace 2120 for the 262 imaging events. FIG. 21A illustrates a legend showing the scale for the magnitude of voltage. FIG. 21D show a 50% rise time at t=−0.05±0.08 ms.

Whole Cell Patch Clamp Experiment

Aspects of the disclosure were applied to determine a time relationship between a FRET change and calcium influx into a cell in response to a voltage pulse. Imaging of the cell was performed using the system described above in the experiment section. A TTL signal from the EMCCD was used to determine the exposure time of each frame. The whole cell footprint was analyzed for intensity to determine fluorescence, e.g., a representative value for an image frame. For a given cell, between 1000-1300 pixels were used to generate the representative intensity value for each frame. The representative intensity value for a frame was assigned to all the trace values for trace points for the exposure time for the frame and half the readout time before and after the frame. This assignment was repeated for each frame to generate the individual intensity trace.

Figure 22:
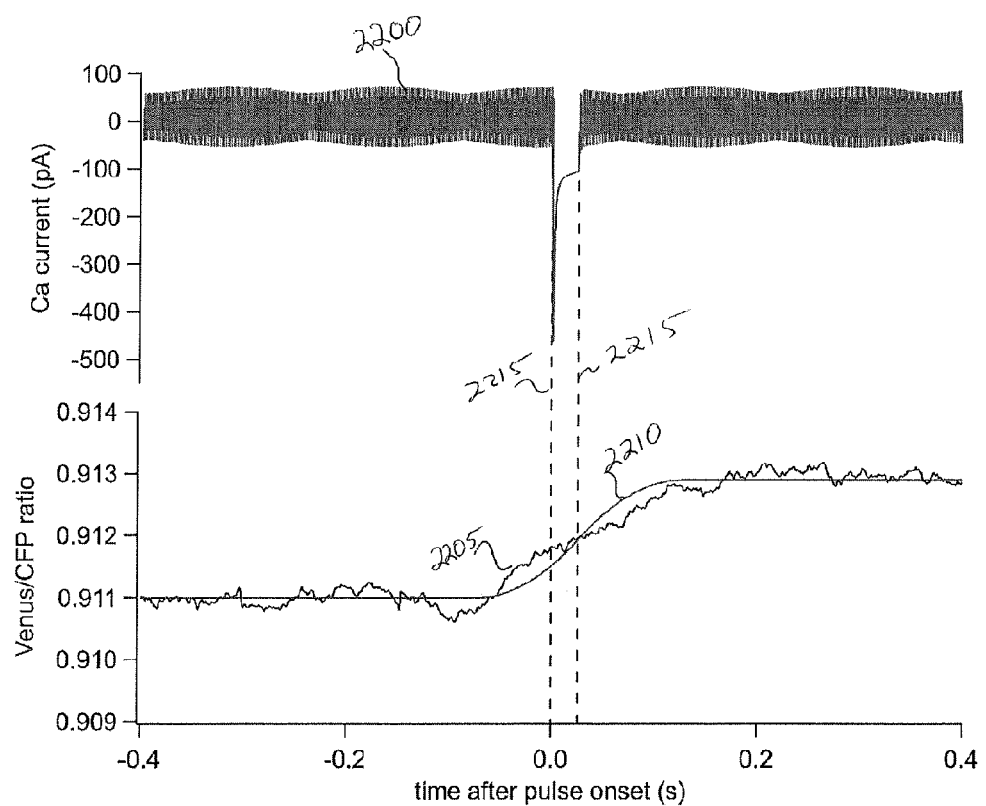
FIG. 22 depicts average continuous intensity traces determined in accordance with aspects of the disclosure from a whole cell patch clamp experiment where a voltage pulse stimulated calcium influx into a cell which was recorded simultaneously with total internal reflection (TIR) fluorescence imaging.

The cell was prepared as described above in the experiment section. Calcium influx into the cell was detected using a patch clamp amplifier (model EPC-P by HEKA Instruments Inc.) The patch clamp amplifier was connected to the Data Processing Device 100. A patch electrode was pressed onto a cell surface. A glass pipette was used for suctioning to rupture a portion of the cell membrane. The glass pipette had an electrolyte solution which was in communication with the intracellular fluid when the membrane was ruptured. A voltage pulse was applied to the electrode controlling a voltage of the cell membrane and the current detected by the electrode was recorded simultaneously with the imaging of the cell. The simultaneous recording was repeated over 2400 times. The voltage pulse had a duration of 25 ms. The voltage pulse stimulated a calcium influx into the cell. Before and after the voltage pulse, a constant sine wave voltage was applied to the cell. The current was measured in pA FIG. 22 depicts the results of the experiment showing average traces for the current and FRET determined in accordance with aspects of the disclosure. Over 2500 individual intensity traces for the detected current and FRET were shifted and averaged to generate the average continuous intensity traces for the current and the FRET, respectively. The individual intensity traces for the FRET were shifted to align the timing of the start of the pulse, e.g., reference event for each trace. In accordance with aspects of the disclosure, the reference event could also have been the detected current.

The average continuous intensity trace for the detected current (calcium influx) is depicted as trace 2200. A negative spike occurs almost immediately after the pulse onset. The average continuous intensity trace is centered at T=0, the time the voltage pulse commenced. The average continuous intensity trace for the FRET is depicted as trace 2205. Trace 2205 was fitted to a step response function 2210 (with no delay). Based on the half maximum intensity time, the FRET change occurred 25-30 ms after the onset of the voltage pulse. The two vertical dashed lines 2215 represents the duration of the voltage pulse.

The horizontal axis is a time after the onset of the voltage pulse in seconds. The vertical axis includes both the current (CA current) in pA and the Venus/CFP ratio, e.g., FRET. The change in the FRET ratio was approximately 0.2%.

The word "comprising", "comprise", "comprises", "including", "include" or "includes" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (1) any single item in the list, (2) all of the items in the list, or (3) any combination of the items in the list. The use of numbers, such as "first" or "second," is for distinguishing otherwise identical terminology, and is not intended to imply that operations or steps must occur in any particular order, unless otherwise indicated.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electro-magnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terms "Data Processing Device" and "System" as may be used in the present disclosure may include a variety of combinations of fixed and/or portable computer hardware, software, peripherals, and storage devices. The Data Processing Device may include a plurality of individual components that are networked or otherwise linked to perform collaboratively, or may include one or more stand-alone components. The hardware and software components of the Data Processing Device of the present disclosure may include and may be included within fixed and portable devices such as desktop, laptop, and/or server, and network of servers (cloud).

It should also be noted that, in some alternative implementations, the functions noted in the block may occur out of the order noted in the figures. For example, two blocks shown in succession may, in fact, be executed concurrently, substantially concurrently, or the blocks may sometimes be executed in the reverse order, depending upon the functionality involved.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure. Specific examples and embodiments describe herein were chosen and described in order to best explain the principles of the disclosure and the practical application thereof, and to enable others of ordinary skill in the art to understand the disclosure for various embodiments with various modifications as are suited to the particular use contemplated.

What is claimed is:

1. A method comprising:
   storing a timing of a reference event, the reference event occurring during a frame time of an image frame from a plurality of imaging events, the frame time being an exposure time and a readout time for an imaging source, each imaging event having at least one set of image frames, each set of image frames being recorded simultaneously, each set of image frames having a plurality of image frames;
   receiving at least one channel of image data for each imaging event from the imaging source, where one channel of image data corresponds to one set of image frames, respectively;
   calculating, for each imaging event, image values for a representative frame set, the representative frame set being determined based on the at least one set of image frames, where one image value is calculated for each image frame of the representative frame set, each image value being based on a characteristic of a plurality of pixels within a respective image frame of the representative frame set, the representative frame set having the same number of image frames as the at least one set of image frames, the characteristic being determined from the at least one channel of image data;

assigning, for each imaging event, the calculated image value of a respective image frame as a trace value for each trace point during the exposure time of the respective image frame and a portion of the readout time before the exposure time of the respective image frame and a portion of the readout time following the exposure time of the respective image frame to generate an intensity trace for a respective imaging event, the assigning being performed for each image frame in the representative frame set for the respective imaging event;

shifting in time, the intensity trace for each respective imaging event to align the timing of the reference event for each imaging event of the plurality of imaging events;

averaging, trace values of trace points aligned in time from each shifted intensity trace to generate an average continuous intensity trace over time; and determining, a timing of an event based on the average continuous intensity trace.

2. The method of claim 1, further comprising:
comparing the timing of the event with the timing of the reference event.

3. The method of claim 1, wherein the timing of the event is determined based on an intensity change in the average continuous intensity trace.

4. The method of claim 3, wherein the timing of the intensity change is a time where an intensity of the average continuous intensity trace is half maximum intensity.

5. The method of claim 1, wherein the portion of the readout time before exposure time of the respective image frame and the portion of the readout time following the exposure time of the respective image frame is half the readout time.

6. The method of claim 1, wherein the reference event is a single vesicle release event.

7. The method of claim 1, wherein a number of pixels and a location of pixels included in the plurality of pixels is determined based on a location of the single vesicle release event.

8. The method of claim 3, wherein the intensity change indicates a fluorescence resonance energy transfer (FRET).

9. The method of claim 8, wherein the at least one channel of image data includes two channels of image data, and wherein the at least one set of image frames includes two sets of image frames, and wherein the representative frame set is determined based on a ratio of the two sets of image frames.

10. The method of claim 9, wherein one of the two channels of image data has a wavelength band of 465-495 nm and one of the two channels of image data has a wavelength band of 520-550 nm.

11. The method of claim 1, further comprising: fitting a step response function to the average continuous intensity trace, and determining the timing of the event based on trace value for the step response function.

12. The method of claim 1, further comprising: determining the timing of the reference event.

13. A device comprising:
a storage device configured to store at least one channel of image data for a plurality of imaging events received from an imaging source, each imaging event having at least one set of image frames, each set of image frames being recorded simultaneously, each set of image frames having plurality of image frames, and a timing of a reference event, the reference event occurring during a frame time of an image frame from the plurality of imaging events, the frame time being an exposure time and a readout time for the imaging source;

a processor comprising hardware configured to:
calculate, for each imaging event, image values for a representative frame set, the representative frame set being determined based on the at least one set of image frames, where one image value is calculated for each image frame of the representative frame set, each image value being based on a characteristic of a plurality of pixels within a respective image frame of the representative frame set, the representative frame set having the same number of image frames as the at least one set of image frames, the characteristic being determined from the at least one channel of image data;

assign, for each imaging event, the calculated image value of a respective image frame as a trace value for each trace point during the exposure time of the respective image frame and a portion of the readout time before exposure time of the respective image frame and a portion of the readout time following the exposure time of the respective image frame to generate an intensity trace for a respective imaging event, the assigning being performed for each image frame in the representative frame set for the respective imaging event, shift, in time, the intensity trace for each respective imaging event to align the timing of the reference event for each imaging event of the plurality of imaging events, average, trace values of trace points aligned in time from each shifted intensity trace to generate an average continuous intensity trace over time; and determine, a timing of an event based on the average continuous intensity trace;

a display configured to display the average continuous intensity trace.

14. The device of claim 13, wherein the timing of the event is based on a timing of an intensity change in the average continuous intensity trace.

15. The device of claim 14, wherein the timing of the intensity change is a time where an intensity of the average continuous intensity trace is half maximum intensity.

16. The device of claim 13, wherein the processor is further configured to compare a timing of the event with the timing of the reference event.

17. The device of claim 13, wherein the imaging source is an electron multiplying charge coupled device camera.

18. The device of claim 13, wherein the reference event is a single vesicle release event.

19. The device of claim 18, further comprising an interface configured to receive current values from an electrode array, the electrode array comprising at least three electrodes, wherein the storage device is further configured to store the received current values, the current values being simultaneously recorded during each imaging event.

20. The device of claim 19, wherein the processor is further configured to determine a timing of a single vesicle release event from a magnitude of the current values received from each of the at least three electrodes in the electrode array.

21. The device of claim 20, wherein the processor is further configured to compare the timing of the single vesicle release event with the timing of the event.

22. The device of claim 15, wherein the intensity change indicates a fluorescence resonance energy transfer (FRET).

23. The device of claim 22, wherein the at least one channel of image data includes two channels of image data, and wherein the at least one set of image frames includes two sets of image frames, and wherein the representative frame set is determined based on a ratio of the two sets of image frames.

24. The device of claim 23, wherein one of the two channels of image data has a wavelength band of 465-495 nm and one of the two channels of image data has a wavelength band of 520-550 nm.

25. A computer readable storage device having a program, which when executed by a computer, causes the computer to execute a method of:

calculating, for each imaging event of a plurality of imaging events, where each imaging event has at least one set of image frames, each set of image frames being recorded simultaneously and each set of image frames having plurality of image frames, image values for a representative frame set, the representative frame set being determined based on the at least one set of image frames, where one image value is calculated for each image frame of the representative frame set, each image value being based on a characteristic of a plurality of pixels within a respective image frame of the representative frame set, the representative frame set having the same number of frames as the at least one set of image frames, the characteristic being determined from the at least one channel of image data;

assigning, for each imaging event of the plurality of imaging events, the calculated image value of a respective image frame as a trace value for each trace point during the exposure time of the respective image frame and a portion of the readout time before exposure time of the respective image frame and a portion of the readout time following the exposure time of the respective image frame to generate an intensity trace for a respective imaging event, the assigning being performed for each image frame in the representative frame set for the respective imaging event;

shifting in time, the intensity trace for each respective imaging event to align the timing of a reference event for each imaging event of the plurality of imaging events, the reference event occurring during a frame time of an image frame in each of the plurality of imaging events, the frame time being an exposure time and a readout time for an imaging source;

averaging, trace values of trace points aligned in time from each shifted intensity trace to generate an average continuous intensity trace over time; and determining, a timing of an event based on the average continuous intensity trace.

* * * * *

UNITED STATES PATENT AND TRADEMARK OFFICE
CERTIFICATE OF CORRECTION

| | | |
|---|---|---|
| PATENT NO. | : 9,596,417 B2 | Page 1 of 1 |
| APPLICATION NO. | : 14/769906 | |
| DATED | : March 14, 2017 | |
| INVENTOR(S) | : Manfred Lindau | |

It is certified that error appears in the above-identified patent and that said Letters Patent is hereby corrected as shown below:

In the Specification

Column 1, Line 11 should read:
STATEMENT REGARDING FEDERALLY SPONSORED RESEARCH
This invention was made with government support under grant number GM085808 awarded by the National Institutes of Health and grant number 0335765 awarded by the National Science Foundation. The government has certain rights in the invention.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*